(12) United States Patent
See et al.

(10) Patent No.: US 6,226,728 B1
(45) Date of Patent: May 1, 2001

(54) DYNAMIC ALLOCATION FOR EFFICIENT MANAGEMENT OF VARIABLE SIZED DATA WITHIN A NONVOLATILE MEMORY

(75) Inventors: Deborah L. See; Robert N. Hasbun, both of Placerville; Jeffrey A. Dunlap; Phillip J. del Pozo, III, both of Folsom, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/063,954

(22) Filed: Apr. 21, 1998

(51) Int. Cl.[7] .................................................. G06F 12/06

(52) U.S. Cl. .......................................... 711/171; 711/103

(58) Field of Search ................................... 711/170, 171, 711/172, 173, 165, 103; 707/205

(56) References Cited

U.S. PATENT DOCUMENTS

| | | | |
|---|---|---|---|
| 5,406,529 | 4/1995 | Asano | 365/230.03 |
| 5,420,999 | * 5/1995 | Mundy | 395/425 |
| 5,469,390 | 11/1995 | Sasaki et al. | 365/200 |
| 5,682,497 | 10/1997 | Robinson | 395/430 |
| 5,737,742 | 4/1998 | Achiwa et al. | 711/103 |
| 5,847,995 | 12/1998 | Kobayashi et al. | 365/185.18 |
| 5,860,124 | 1/1999 | Matthews et al. | 711/165 |

OTHER PUBLICATIONS

Chiang et al., "Managing Flash Memory in Personal Communication Devices", 1997, P177–182, IEEE.*

* cited by examiner

Primary Examiner—Kevin L. Ellis
(74) Attorney, Agent, or Firm—Blakely, Sokoloff, Taylor & Zafman LLP

(57) ABSTRACT

A method of storing data in a nonvolatile memory includes the step of receiving the data to be stored. A storage structure is selected for the data according to the relative size (z) of the data with respect to a plurality of thresholds including: a minimum number of instances (m), a maximum single instance size (s*g), and an allocation granularity (g). The data is then stored in the selected structure within the nonvolatile memory. If z is less than a first threshold, the data is stored within a multiple instance object structure. If z is less than a second threshold, the data is stored as a single instance object. If z exceeds the second threshold, the data is fragmented. The fragmented data can then be stored among the plurality of blocks of nonvolatile memory. If the number of fragments is less than a maximum sequence table size, then a sequence table indicative of the order and the locations of the data fragments is stored in the nonvolatile memory. If the number of data fragments exceeds the maximum sequence table size, then a plurality of sequence table fragments and a group table are stored in the nonvolatile memory. The group table indicates the order and the location of the sequence table fragments which in turn indicate the order and the location of the data fragments within the nonvolatile memory.

14 Claims, 20 Drawing Sheets

INSTANCE INFORMATION

MULTIPLE INSTANCE STRUCTURE
400

| INSTANCE SIZE 402 | NUMBER OF INSTANCES 404 | STATUS 1 VALID 422 | STATUS 2 ERASED 432 | STATUS 3 ERASED 442 | STATUS 4 ERASED 452 |
|---|---|---|---|---|---|
| INSTANCE 1 VALID DATA 420 || INSTANCE 2 ERASED 430 || INSTANCE 3 ERASED 440 | INSTANCE 4 ERASED 450 |

460

INSTANCE STATUS

| VALUE | STATUS | DEFINITION |
|---|---|---|
| 1111 | EMPTY | UNUSED DATA INSTANCE |
| 0111 | ALLOCATING | INSTANCE BEING WRITTEN |
| 0101 | INVALIDATE | INVALIDATION IN PROGRESS |
| 0011 | ALLOCATED | INSTANCE BEING WRITTEN |
| 0001 | VALID | INSTANCE HOLDS VALID DATA |
| 0000 | INVALID | INSTANCE DOES NOT HOLD VALID DATA |

Figure 4

510 ENTRY STRUCTURE FOR GROUP/SEQUENCE TABLES

| BLOCK NUMBER 512 | ENTRY STATUS 514 | ENTRY INSTANCE 516 | ENTRY SIZE 518 | OLD ENTRY SIZE 520 | PHYSICAL INDEX 522 |
|---|---|---|---|---|---|

ENTRY STATUS 560

| VALUE | STATUS | DEFINITION |
|---|---|---|
| 1111 | EMPTY | ENTRY AVAILABLE |
| 0111 | ALLOCATING | ENTRY BEING WRITTEN |
| 0011 | ENTRY WRITTEN | ENTRY HAS BEEN WRITTEN |
| 0001 | VALID | ENTRY DESCRIBES VALID DATA |
| 0101 | INVALIDATE | USED DURING POWER LOSS RECOVERY |

Figure 5

DYNAMIC ALLOCATION FOR EFFICIENT MANAGEMENT OF VARIABLE SIZED DATA WITHIN A NONVOLATILE MEMORY

FIELD OF THE INVENTION

This invention relates to the field of computer memory storage systems. In particular, this invention is drawn to dynamic allocation for efficient management of variable sized data within a nonvolatile memory.

BACKGROUND OF THE INVENTION

Communications devices such as cellular telephones and pagers need the ability to store both data and code. In addition, these communications devices typically require some sort of working memory.

These communication devices generally need to store the code and at least some of the data in nonvolatile memory. For example, serial numbers, authorization codes, frequently dialed numbers, etc. are examples of data that might be stored in nonvolatile memory. Given that the code and data are updated at different frequencies, the communications devices often used different types of nonvolatile memory for storage of data and code. As a result, prior art communications devices typically included one type of nonvolatile memory for code storage, another nonvolatile memory for data storage, and random access memory such as static random access memory for working memory.

One type of nonvolatile memory is a flash electrically erasable programmable read only memory (flash EEPROM). Flash EEPROM (hereinafter "flash memory") is typically arranged as blocks of single transistor memory cells. Although flash memory is rewritable, the memory cells cannot be re-programmed unless they have first been erased. Moreover, the cells are erasable only in blocks. Thus in order to erase one cell, an entire block of cells must be erased. Updating the flash memory requires some form of media manager to handle copying of valid information out of the block, erasing the block, and writing the valid information as well as the update information to the same or another block. The process of erasing, writing, etc. is relatively time consuming.

Another type of nonvolatile memory is an electrically erasable programmable read only memory (EEPROM) having two-transistor memory cells. Although EEPROM may be arranged into erasable blocks similar to the flash memory, the two-transistor EEPROM is relatively easy to update and does not require the sophisticated media management that flash memory requires for updates. Writing a value to the two-transistor EEPROM cell, however, requires significantly greater time than does programming of an erased single transistor flash memory cell.

One prior art communications device memory architecture includes flash memory for code storage, EEPROM for data storage, and random access memory as working memory.

The use of a variety of nonvolatile memories tends to increase form factor size as well as design and fabrication costs. Personal communications devices such as pagers and cellular telephones are often differentiated based on their size, features, cost, and rate of power consumption.

Moreover as new features are constantly being added, the ratio of code to data may need to change. Providing excess storage for both types of nonvolatile memory increases the cost of the device and is wasteful, unless the storage requirements for both the code and the data are expected to grow. By storing code and data into different types of nonvolatile memory, excess storage capacity in the nonvolatile memory used for code is unavailable for storing data. Similarly, excess storage capacity in the nonvolatile memory used for data is unavailable for storing code. Thus the design is unable to easily accommodate changes in the ratio of nonvolatile memory allocated to code versus that allocated to data.

SUMMARY OF THE INVENTION

In view of limitations of known systems and methods, a plurality of storage structures are provided for efficient management of large and small data in a nonvolatile memory. A method of storing data in a nonvolatile memory includes the step of receiving the data to be stored. A storage structure is selected for the data according to the relative size (z) of the data with respect to a plurality of thresholds including: a minimum number of instances (m), a maximum single instance size (s*g), and an allocation granularity (g). The data is then stored in the selected structure within the nonvolatile memory.

In one embodiment, if z is less than a first threshold, the data is stored within a multiple instance object structure. If z is less than a second threshold, the data is stored as a single instance object.

In one embodiment, the data is fragmented if z exceeds the second threshold. The fragmented data can then be stored among the plurality of blocks of nonvolatile memory.

If the number of fragments is less than a maximum sequence table size, then a sequence table indicative of the order and the locations of the data fragments is stored in the nonvolatile memory.

If the number of data fragments exceeds the maximum sequence table size, then a plurality of sequence table fragments and a group table are stored in the nonvolatile memory. The group table indicates the order and the location of the sequence table fragments which in turn indicate the order and the location of the data fragments within the nonvolatile memory.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 4 illustrates a multiple instance storage structure.

FIG. 5 illustrates a sequence table entry and status values.

DETAILED DESCRIPTION

Figure 1:
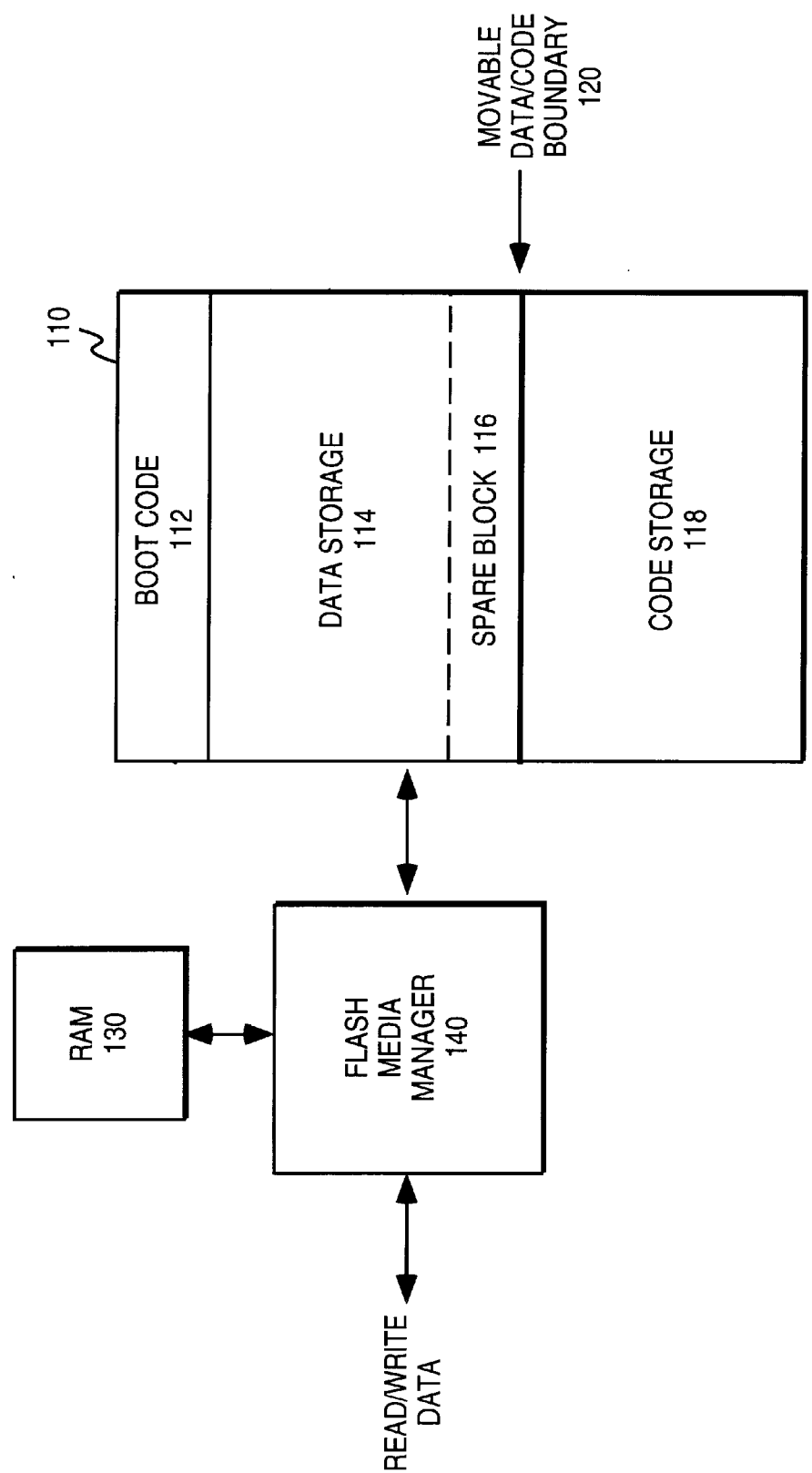
FIG. 1 illustrates storage of code and data in the same monolithic nonvolatile memory device.

FIG. 1 illustrates the storage of both code and data in a monolithic nonvolatile memory device 110. In one embodiment, the nonvolatile memory comprises a plurality of individually erasable blocks. The amount of space allocated to the data and code portions may span one or more blocks as long as the data and code portion do not share a same block.

Nonvolatile memory device 110 has a boot code 112 portion, a data storage 114 portion, a spare block 116, and a code storage 118 portion. The spare block 116 is an actual physical block of the nonvolatile memory device. As will be described below, logical block numbers are used so that the spare block can be any physical block within the data portion 114.

Spare block 116 is used during the reclamation process to recover the valid contents of another block before erasing that other block to free up the space used by invalid contents. Due to the characteristics of flash memory and the relatively long time required to erase a block, superseding data is written to a new location within the nonvolatile memory. The older version of the data is invalidated and the space associated with the invalid data can subsequently be reclaimed by erasing the block after copying any valid data in the block to the spare block. After erasure, the erased block becomes the new spare block.

Figure 2:
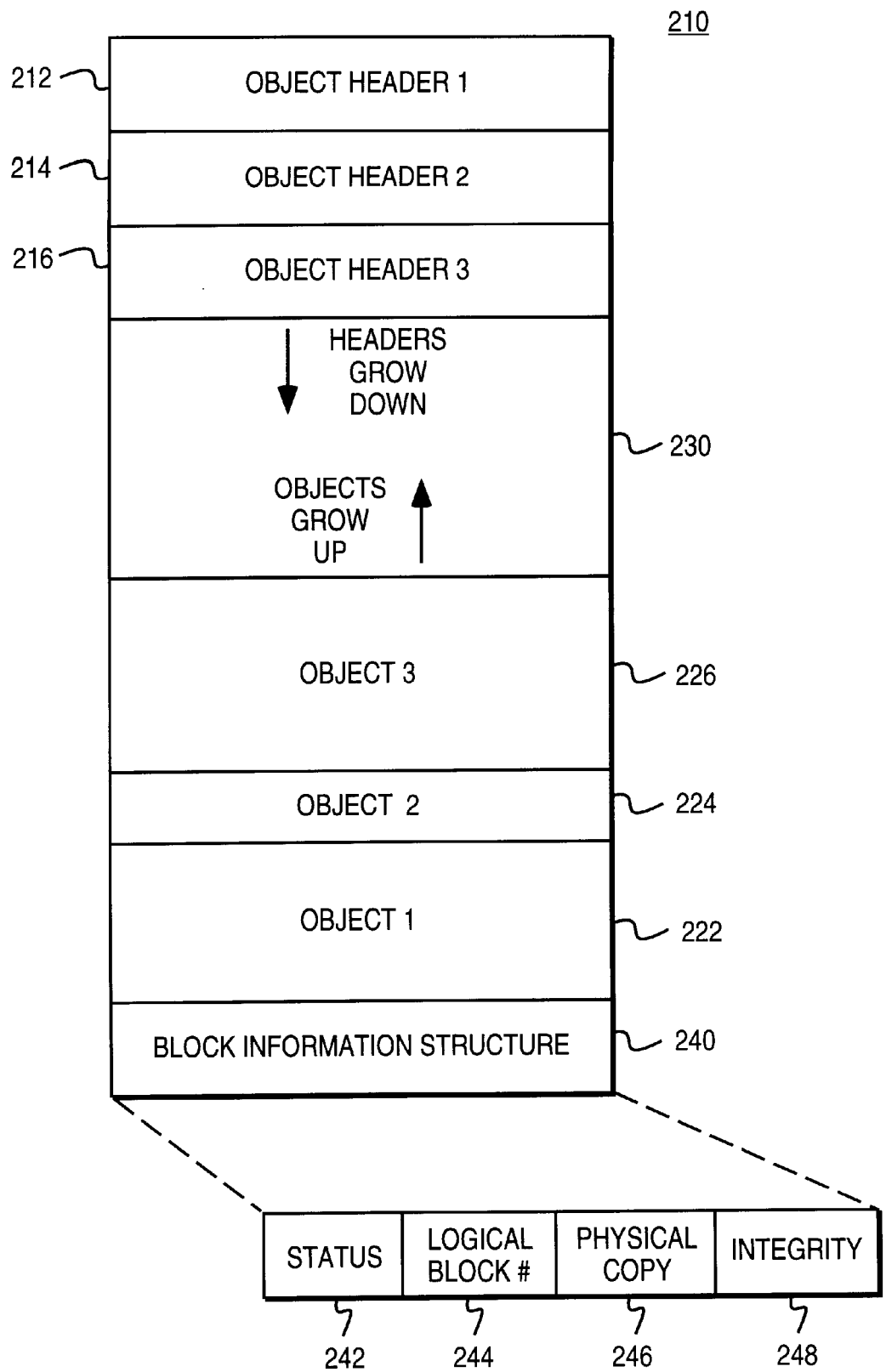
FIG. 2 illustrates the storage of objects within a block of the nonvolatile memory.

FIG. 2 indicates how data is identified and stored within one of the individual blocks allocated to the data storage 114 portion of FIG. 1. The minimal amount of space that can be allocated is referred to as the unit granularity, or simply granularity. The data to be stored is allocated into individual areas spanning one or more units of granularity. Each of these areas is referred to as an object. For example, block 210 includes objects 1, 2, and 3. Each object within the block is identified by an object header. Thus for example, header 1 (212) identifies object 1 (222); header 2 (214) identifies object 2 (224); and header 3 (216) identifies object 3 (226).

The headers are written to a selected block proceeding contiguously from a first end of the block to a second end of the block. The object associated with each header is written to the block proceeding contiguously from the second end towards the first end of the block. Thus the headers and objects "grow" towards each other as additional objects and headers are stored in the block 210.

Each block 210 also has a block information structure 240. The block information structure 240 maintains a logical block number 244 and tracks the reclamation status 242 for block 210. The use of a logical block number permits information to be stored logically contiguously without actual physical block contiguity.

During reclamation, the valid contents of a block scheduled for reclamation must be copied to another block before the block scheduled for reclamation can be erased. In one embodiment, the block information structure includes physical copy 246 to indicate the physical block being copied from during a reclamation. This is useful for recovery procedures if the copying were interrupted, for example, by a power failure. In addition, the physical copy 246 field aids in identifying any blocks that may have been in the process of being erased in the event that the erase operation was interrupted, for example, by a power failure.

The block information structure 240 also includes an integrity field 248. The integrity field is used to ensure the integrity of the block information structure 210 itself.

Figure 3:
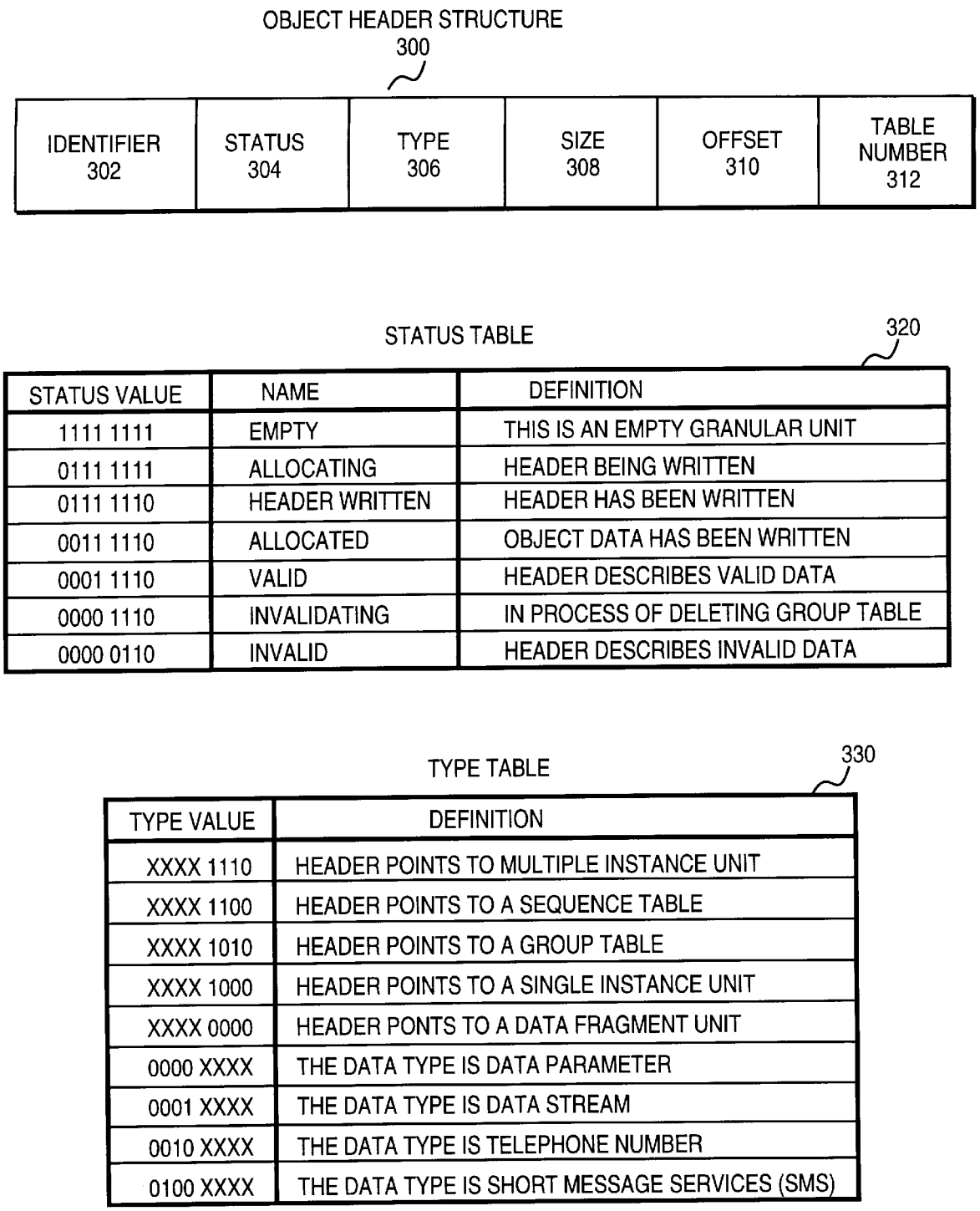
FIG. 3 illustrates an object header structure.

FIG. 3 illustrates one embodiment of the header data structure 300. The header data structure includes identifier 302, status 304, type 306, size 308, and offset 310 fields. The identifier 302 field identifies the associated object. For example, the identifier might be a name or a number for the data (e.g., parameter "X" or "5631").

The status 304 field is used to track the status of the header and object. The status of the header and the object is used when building the RAM lookup table as discussed below as well as when performing power loss recovery. Table 320 indicates one embodiment of a state assignment for the status fields.

Size 308 indicates the size of the object in multiples of allocation units. Thus if the minimum allocation unit (i.e., granularity) is 4 Kb, a size of 8 indicates that the object is 32 Kb in size.

Offset 310 is used to identify the location of the object within the block. In one embodiment, offset 310 is a pointer indicating the offset of the object as measured from the bottom of the block in granular units.

Type 306 is used to indicate the object's type and structure. In one embodiment, a first portion of type 306 is used to identify pre-determined object structures. A second portion of type 306 identifies the contents of the pre-determined object structure (i.e., the type of data stored within that structure). The pre-determined object structures are designed to accommodate a range of object sizes as well as variations in expected volatility of the object.

The types of data are generally specific to the application. In one embodiment, the nonvolatile memory device supports wireless communication devices such as a cellular telephone or pager. Examples of types of data for communications applications include data parameters (e.g., for tracking origin, destination, and length of communication), data streams, telephone numbers, facsimile numbers, etc., or other user-definable types.

Table Number 312 is used to associate fragmented data with tables used to track the location of the fragmented data. The use of Table Number 312 is used to minimize the amount of updating that must take place when changes are made to a fragmented object as will be described below.

In one embodiment, the pre-determined object structures include: multiple instance object, single instance object, data fragment, sequence table, sequence table fragment, and group table.

A single instance object can fit entirely within a block. A single instance object is allocated in multiples of the allocation granularity. A single instance object is not permitted to span blocks. In order to retrieve data stored as a single instance object requires merely examining the header to determine the location of the single instance object and then retrieving the single instance object itself.

A multiple instance unit is designed to store relatively small sized data that can be updated several times using the same space originally allocated for storing the object. This is particularly useful for frequently updated data such as variables.

FIG. 4 illustrates the structure of multiple instance object 400. Providing for multiple instances within the same allocated space reduces the overhead in managing small data parameters and improves the performance of updates.

The multiple instance object 400 includes instance information 410 to indicate the size of each instance and the number of instances within the multiple instance object. Following the instance information 410 are a plurality of status fields 422, 432, 442, and 452. Each status field is associated with one instance of the object. Thus, for example, status 422 applies to instance 420. Status 432 applies to instance 430, 442 applies to 440, and 452 applies to 450. One embodiment for the state assignments for the various status conditions is set forth in table 460.

Another object structure is the data fragment. Some objects must be fragmented in order to be stored within the available space of a plurality of blocks. This may be necessary, for example, if the object is larger than the block. Alternatively, fragmentation may be necessary if the object is larger than the space remaining within a given block. Thus any data spanning physical block boundaries will be fragmented into multiple data fragments. Each of these fragments is referred to as a data fragment object. The data fragment object contains a fragment of the original data, but no other overhead information. A sequence table containing an ordered list of data fragments is used to reassemble the original data from a plurality of data fragments.

FIG. 5 illustrates the structure for each entry of a sequence table fragment and status values for each entry. The entry includes a field for the logical block number (512), entry status (514), instance (516), data fragment size (518), the size of an older version of the data fragment if applicable (520), and a physical index (522). The status values used for entry status are illustrated in table 560. The instance value is used to identify a particular data fragments when an object has more than one data fragment stored in the same block.

Figure 6:
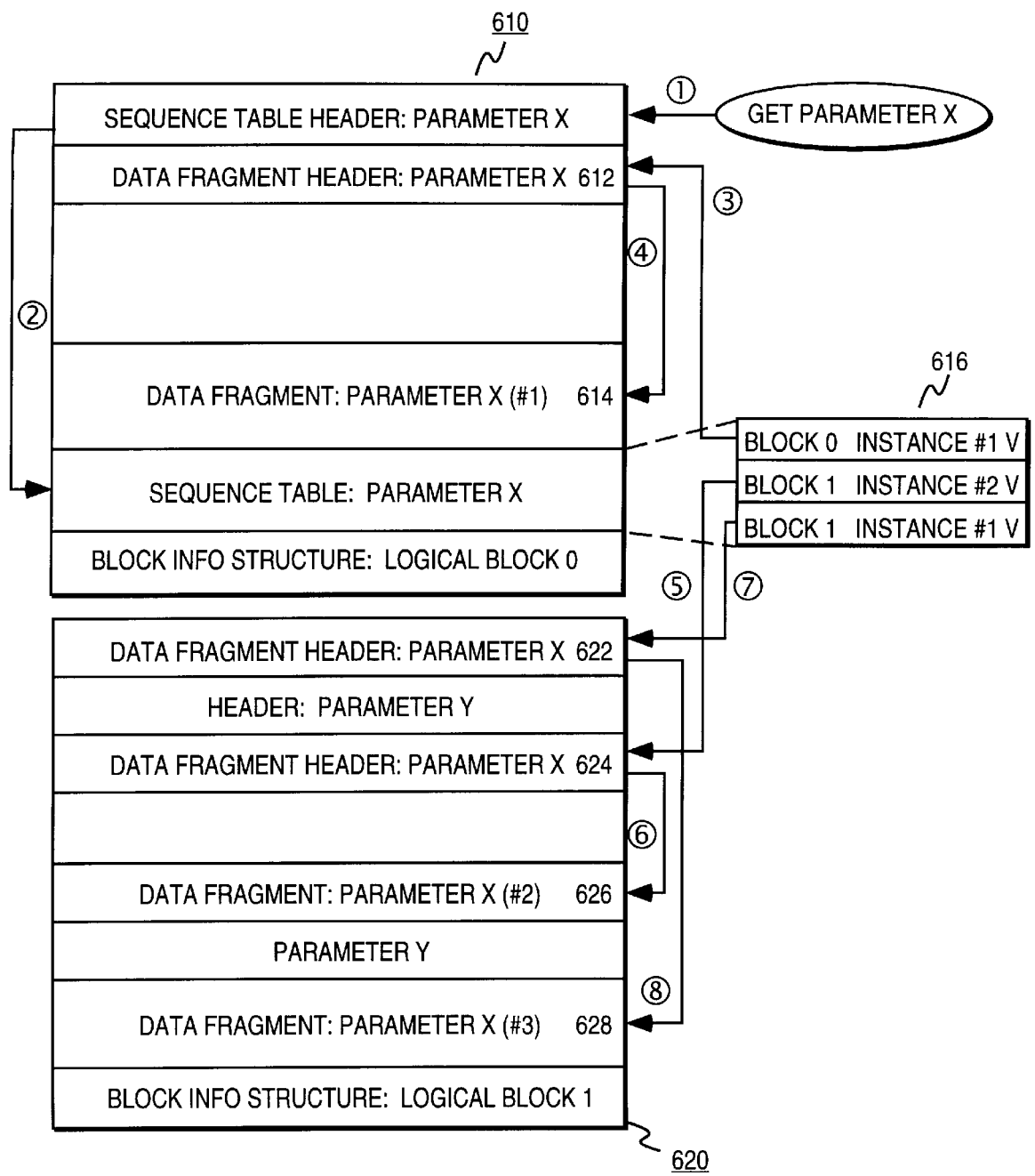
FIG. 6 illustrates the use of a sequence table for identifying the order and location of associated data fragments.

FIG. 6 illustrates a sequence table 616 as well as the process for assembling all the data fragments associated with the sequence table. Thus for example, parameter X has been fragmented into a plurality of data fragments 614, 626, and 628 which are located in physical blocks 610 and 620. The corresponding headers 612, 622, and 624 have their respective Table Number (312) fields set to identify sequence table 616.

Sequence table 616 lists the logical block number and data fragment instance used to reassemble the complete parameter X. Multiple parameter X data fragments within the same block are distinguished by their instance or occurrence within that block as well as a particular sequence table they are associated with. The order of the entries in the sequence table indicates the order in which the data fragments must be assembled in order to form the complete parameter X.

For example, in order to reassemble the parameter X object, a search is conducted for the parameter X sequence table header (indicated in step ①). In one embodiment, the location of the parameter X sequence table header is stored in a data lookup table in order to speed retrieval of the parameter. In this case the data lookup table indicates that parameter X sequence table header is located in logical block 0 (610).

Logical block 0 is scanned to locate the parameter X sequence table header. The parameter X sequence table header identifies the location of parameter X sequence table 616 (as indicated by step ②). Each entry of sequence table 616 identifies the logical block and instance of a data fragment associated with that sequence table needed to reconstruct parameter X.

Sequence table 616 indicates that the first data fragment is the first instance of a parameter X data fragment associated with sequence table 616 located in logical block 0. Thus the first data fragment is located by searching for the first header identifying a parameter X data fragment with a Table Number of 616 in logical block 0 (610) (as indicated by step ③). In this case the first header identifying a parameter X data fragment associated with sequence table 616 in logical block 0 is header 612. Header 612 is then used to locate parameter X data fragment 614 (as indicated by step ④).

Referring to sequence table 616, the next parameter X data fragment is determined to be the second parameter X data fragment in logical block 1. Thus logical block 1 can be searched to locate the second occurrence of a parameter X data fragment header (as indicated by step ⑤). Header 624 identifies the location of parameter X data fragment 626 as indicated by step ⑥.

The final parameter X data fragment is determined to be the first parameter X data fragment in logical block 1 (620). Thus logical block 1 is searched to locate the first occurrence of a parameter X data fragment header. In this example, the first occurrence of a parameter X data fragment header is header 622 as indicated by step ⑦. Parameter X data fragment header 622 identifies the location of the third and final parameter X data fragment 628 as indicated in step ⑧.

If the parameter has a large number of data fragments, the sequence table may need to span physical block boundaries. Alternatively, the number of data fragments may require a sequence table size that exceeds a pre-determined threshold. Rather than attempt to maintain contiguity across multiple logical or physical blocks or permitting the sequence table to grow beyond the pre-determined threshold, another sequence table is created. In one embodiment, this pre-determined threshold is the maximum size permitted for a single instance object. As the size of the sequence table grows, so does the amount of time required to copy the sequence tables when updating blocks.

A group table is used to track individual sequence tables much the same way as sequence tables are used to track data fragments. The use of group tables and multiple sequence tables also tends to reduce the time required to manage copying of sequence tables. The group table effectively fragments a large sequence table into a plurality of smaller sequence tables fragments. When multiple sequence tables are used in conjunction with a group table, the individual sequence tables are identified as sequence table fragments.

Figure 7:
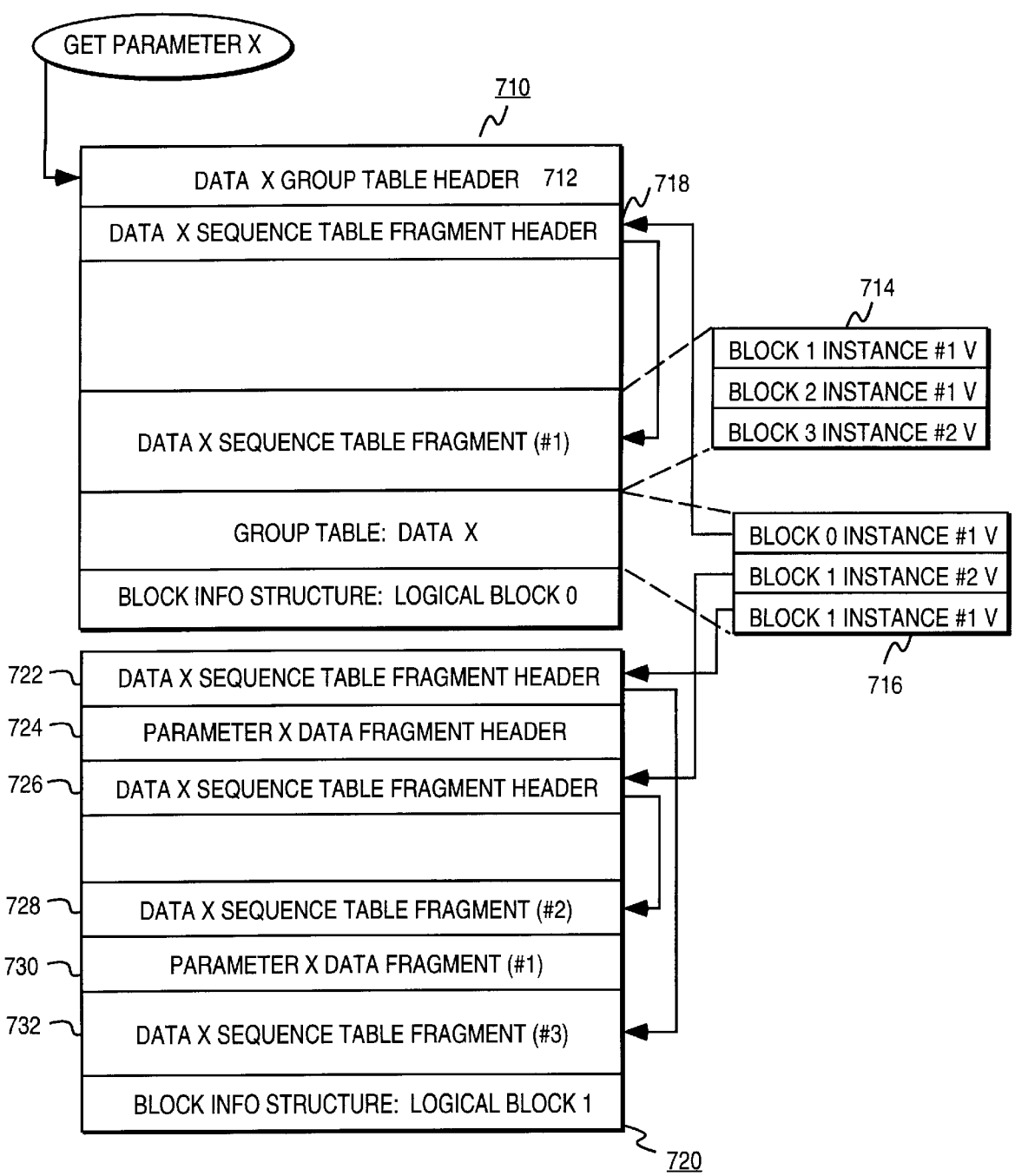
FIG. 7 illustrates the use of a group table for identifying the order and location of associated sequence table fragments.

FIG. 7 illustrates the use of a group table 716 in conjunction with sequence table fragments. Group table 716 is similar to the sequence table structure, however, the fragments identified are sequence tables fragments which themselves identify the location and order of data fragments associated with the object. Each entry of the group table 716 thus indirectly identifies a group of data fragments.

To retrieve parameter X, the parameter's group table header is first located. In this case, the parameter X group table header is found in logical block 0 (710). Group table header 712 identifies group table 716. Each entry of group table 716 identifies the location and instance of a sequence table fragment.

Group table 716 indicates that the first sequence table fragment is the first instance of a parameter X sequence table fragment located in logical block 0. This is located by searching for the first header identifying a parameter X sequence table fragment in logical block 0 (710). In this case, the first header identifying a parameter X sequence table fragment in logical block 0 is header 718. Header 718 can then be used to locate parameter X sequence fragment 714.

Sequence table fragment 714 indicates that the first data fragment is the first instance of a parameter X data fragment associated with sequence table fragment 714 located in logical block 1 (720). Thus logical block 720 is searched to locate the first instance of a parameter X data fragment header 724 that has a Table Number set to indicate sequence table 714. The located header indicates the location of parameter X data fragment 730. The second and third data fragments associated with sequence table 714 are not shown.

The second and third sequence table fragments indicated in group table 716 can similarly be located by finding the headers (726, 722) in the order indicated by the group table and then using the headers to locate the respective second (726) and third (732) sequence table fragments. The entries in a given sequence table refer only to data fragment instances having headers that identify the same given sequence table. Thus for example, a number of data fragments associated with different sequence tables can be located in the same block. When traversing a sequence table to re-assemble the object, however, instances other than those sharing the same sequence table fragment are ignored.

In one embodiment, a data lookup table is used to improve performance of accessing the nonvolatile memory device. When implemented in a computer system, a lookup table can facilitate accessing the data stored within the nonvolatile memory. The data lookup table is built in RAM during initialization of the computer system and updated as appropriate during write and erase operations. The data lookup table provides a pointer to a particular block and offset associated with a selected header for data having a specified identifier.

In one embodiment, the data lookup table uses the identifier as an index to the data. In an alternative embodiment, the data lookup table uses both the identifier and the type as an index to the data. The latter embodiment permits using non-unique identifiers as long as the combination of identifier and type are unique. Moreover, the latter embodiment permits rapid searching based on the type of the data rather than the data's identifier.

Figure 8:
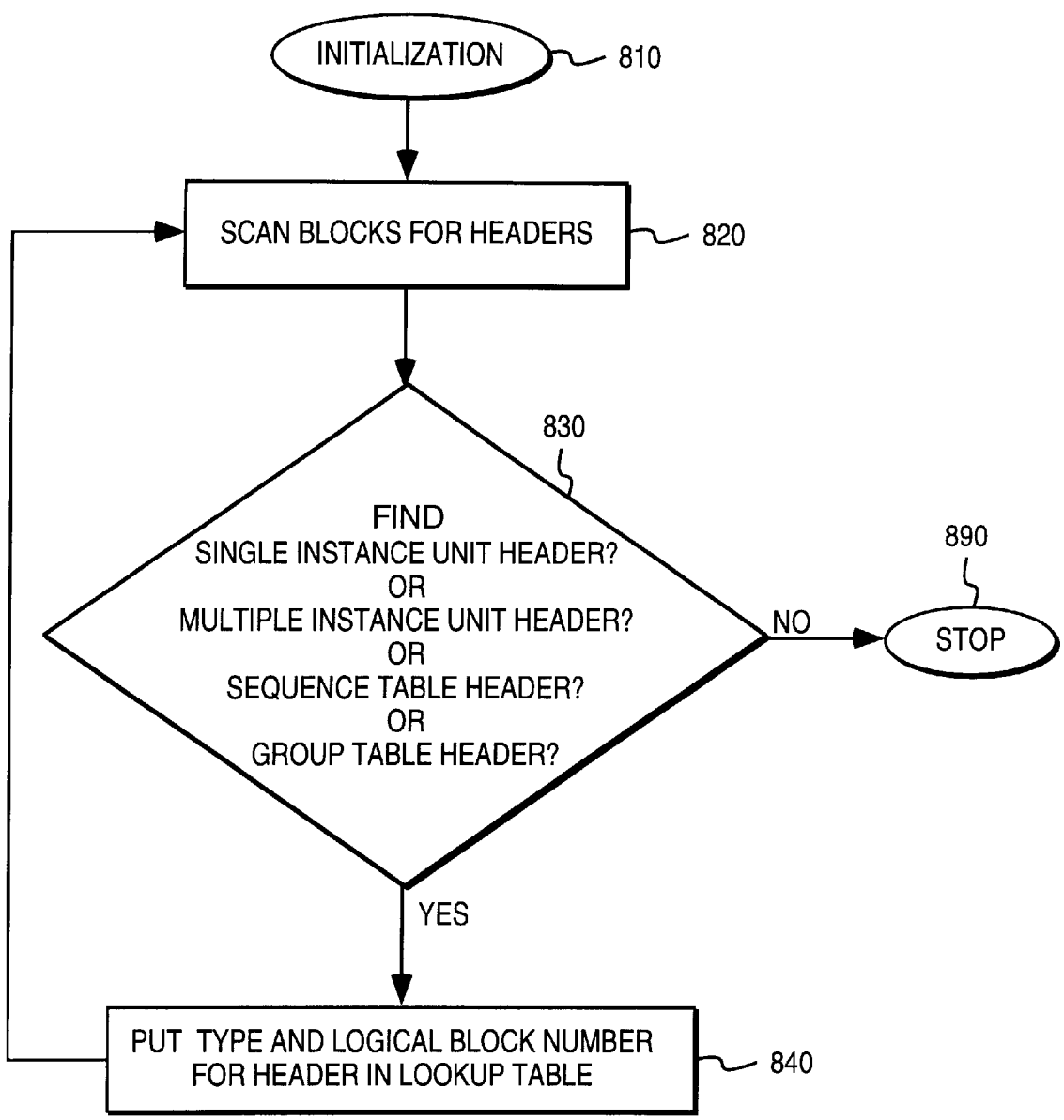
FIG. 8 illustrates a method of creating the data lookup table.

One embodiment of the process for building the data lookup table is illustrated in FIG. 8. Initialization starts in step 810. The physical blocks are scanned for valid single instance headers, sequence table headers, multiple instance headers, and group table headers in step 820. Data fragments are ignored. Similarly, sequence table fragments are ignored.

If a single instance header, sequence table header, multiple instance header, or group table header is found (step 830), then the logical block number as well as the type for the data associated with that header (e.g., logical block 0, parameter X) are stored in the lookup table in step 840. In one embodiment, the identifiers are numbers which correspond to a position within the lookup table rather than a value explicitly stored in the lookup table. As a result, the identifier is used to calculate an entry position in the lookup table. The logical block number and type for that identifier are then stored in the lookup table at the calculated position. In another embodiment, the type is not stored in the data lookup table. Alternatively, the data lookup table may explicitly store the identifier, the logical block number, and the type for the data associated with that header. The scanning process continues until no more such headers are located, then the process is terminated in step 890.

The data lookup table identifies the headers for group table objects, sequence table objects, multiple instance objects, and single instance objects. In order to retrieve parameter X, the data lookup table can be consulted initially rather than scanning the headers of every block in the nonvolatile memory. Individual data fragments and sequence table fragments are not catalogued in the lookup table.

In order to facilitate rapid determination of the available space within the blocks a logical block table is maintained in RAM. The logical block table provides a logical-to-physical block translation map and is created during initialization. During initialization, each physical block is scanned to determine the amount of available space and the amount of invalid space (i.e., space used by invalid objects and headers). This information is collected for each block within the nonvolatile memory device and stored in a logical block status table in RAM. The logical block table can then be updated for subsequent operations to the nonvolatile memory device.

In one embodiment, the storage structure for data being written is automatically selected. The minimum amount of space that can be allocated within the nonvolatile memory is referred to as the unit granularity. The block with the greatest available space is selected as a candidate for writing a new object. The selection of the storage structure for the data to be stored is based on the size (z) of the data with respect to a number of thresholds and the available space within the candidate block.

A multiple instance structure is selected if a predetermined minimum number of multiple instances (m) with accompanying overhead can fit within one granular unit (g). As long as m*z+overhead≦g, the multiple instance data structure can be selected. Thus if $$\frac{g - overhead}{m} \geq z,$$

the multiple instance data structure will be selected.

In the embodiment illustrated in FIG. 4, the overhead includes a 1 byte instance size, a 1 byte number of instances, and one-half byte for each instance. For g=128 bytes and m=3, the multiple instance unit structure can be selected as long as z is less than or equal to $$\frac{g - overhead}{m} = \frac{128 - (1 + 1 + .5(3))}{3} = \frac{124.5}{3} = 41.5 \text{ bytes.}$$

Thus a 40 byte size data, for example, can be stored in a multiple instance structure.

The number of instances in a multiple instance structure is not limited to m. Once the multiple instance structure is selected, the instance size 402 is z, and the number of instances 404 (k) is computed as a value less than or equal to $$\text{int}\left(\frac{g - overhead}{z}\right),$$

where "int" represents the integer function such that "int(x)" returns the integer component of x.

In this case, due to the status fields, the overhead is a function of the number of instances, k. As a result, k is computed as $$\text{int}\left(\frac{g - f}{z + v}\right),$$

where f represents the fixed portion of the overhead independent of the number of instances, and v represents the amount of overhead added for each instance. The fixed portion of the multiple instance overhead is 2 bytes and the per instance overhead is 0.5 bytes. Therefore, in this example, a 7 byte parameter may have up to 16 instances in a multiple instance structure.

If ineligible for a multiple instance structure, the data can be stored as a single instance object as long as the maximum single instance size is not exceeded. In one embodiment, The maximum single instance size is expressed as a number of minimum allocation units. Thus if the unit granularity (g) is 128 bytes, a maximum single instance size (s) of 4 units/fragment indicates that the data must be fragmented if the size of the data exceeds 512 bytes. The data must also be fragmented if the size of the data is less than the amount of available space (z) within the candidate block. If the data size (z) is less than 512 bytes then the data can be stored as a single instance unit as long as sufficient space is available. Expressed mathematically, the single instance object structure is selected as long as $z \leq \min(s*g, z)$, where $\min(a, b) = a$ if $a \leq b$ or b otherwise.

If the size of the data is greater than the maximum single instance size, then the data must be fragmented. Where possible, the data fragments will be as large as the maximum single instance size. The data is stored using data fragments and a sequence table as long as the size of the resulting sequence table does not exceed a maximum sequence table size. Otherwise, the data is stored using data fragments, sequence table fragments, and a group table.

Figure 9:
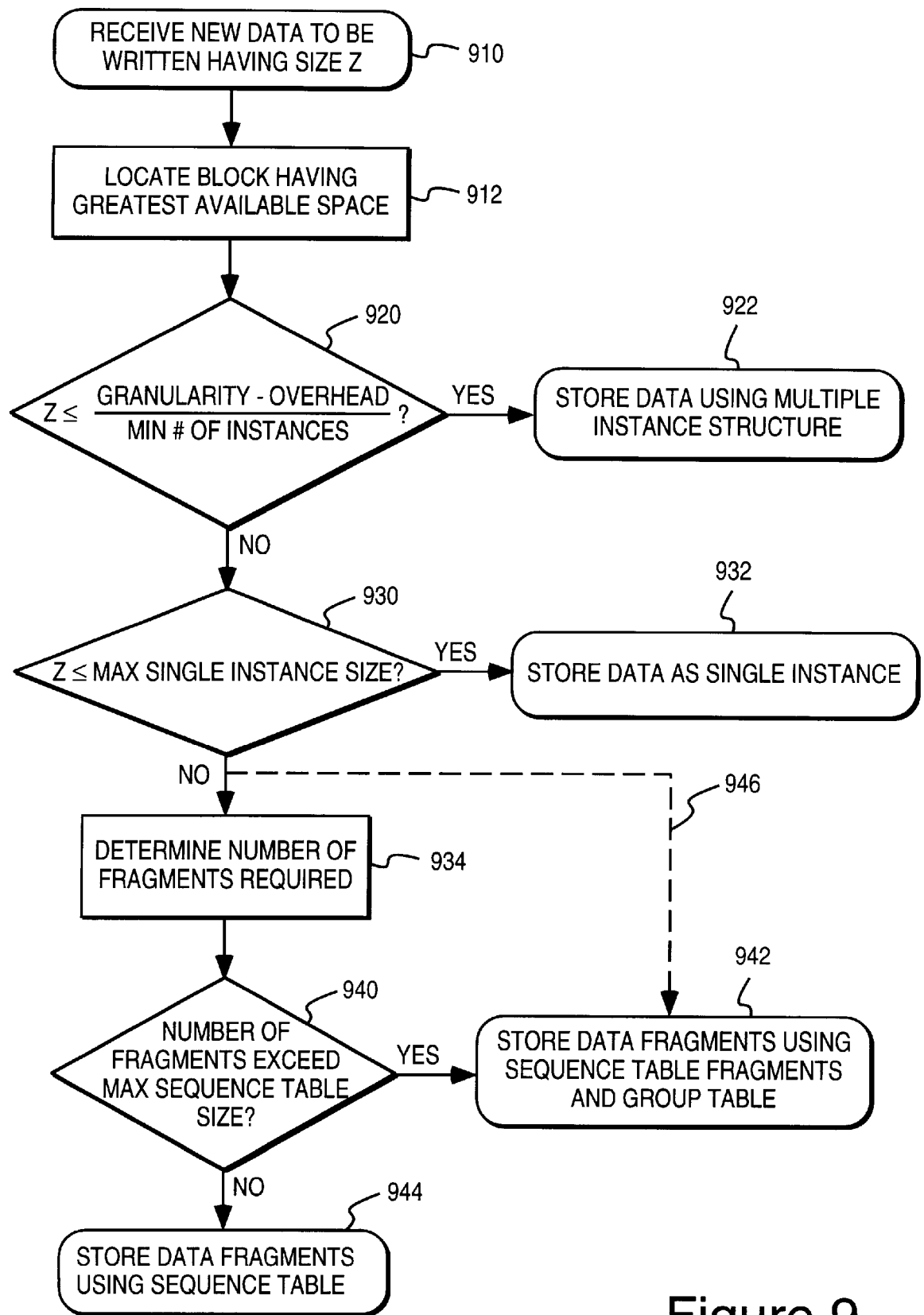
FIG. 9 illustrates a method of selecting a storage structure in accordance with the size (z) of the data with respect to a FIG. 10 illustrates a method of writing a single instance object.

In one embodiment, the determination as to which data structure is used is automated. FIG. 9 illustrates the process for determining which object structure to use for initially storing data in the nonvolatile memory. A request to write data is received in step 910. Typically the nonvolatile memory will comprise a plurality of blocks. During use of the storage system, blocks may have differing amounts of available space. When storing a new data object, the block having the greatest amount of available space is selected in step 912.

If $$z \leq \frac{granularity - overhead}{\min \# \text{ of instances}}$$

as determined in step 920, then the multiple instance structure is selected as the storage structure in step 922. Otherwise processing continues with step 930.

If $z \leq$ maximum single instance size as determined in step 930, then the single instance structure is selected in step 932. A single instance structure is allocated the least integer number (s) of granular units (g) such that $z \leq s*g \leq$ maximum single instance size. If z exceeds the maximum single instance size, then the data must be fragmented. Step 934 determines the number of fragments required for storing the data.

If the number of fragments needed exceeds the maximum size for a sequence table as determined in step 940, then the data will be fragmented and stored using group tables and sequence table fragments as indicated in step 942. Otherwise, the data is stored using sequence tables as indicated in step 944. In an alternative embodiment, there are no individual sequence tables, thus group tables and sequence table fragments are used whenever z exceeds the maximum single instance size. In other words, as indicated by the dotted line 946, once step 930 determines that z>the maximum single instance size, processing continues with step 942 to store the data using group tables, sequence table fragments, and data fragments.

Figure 10:
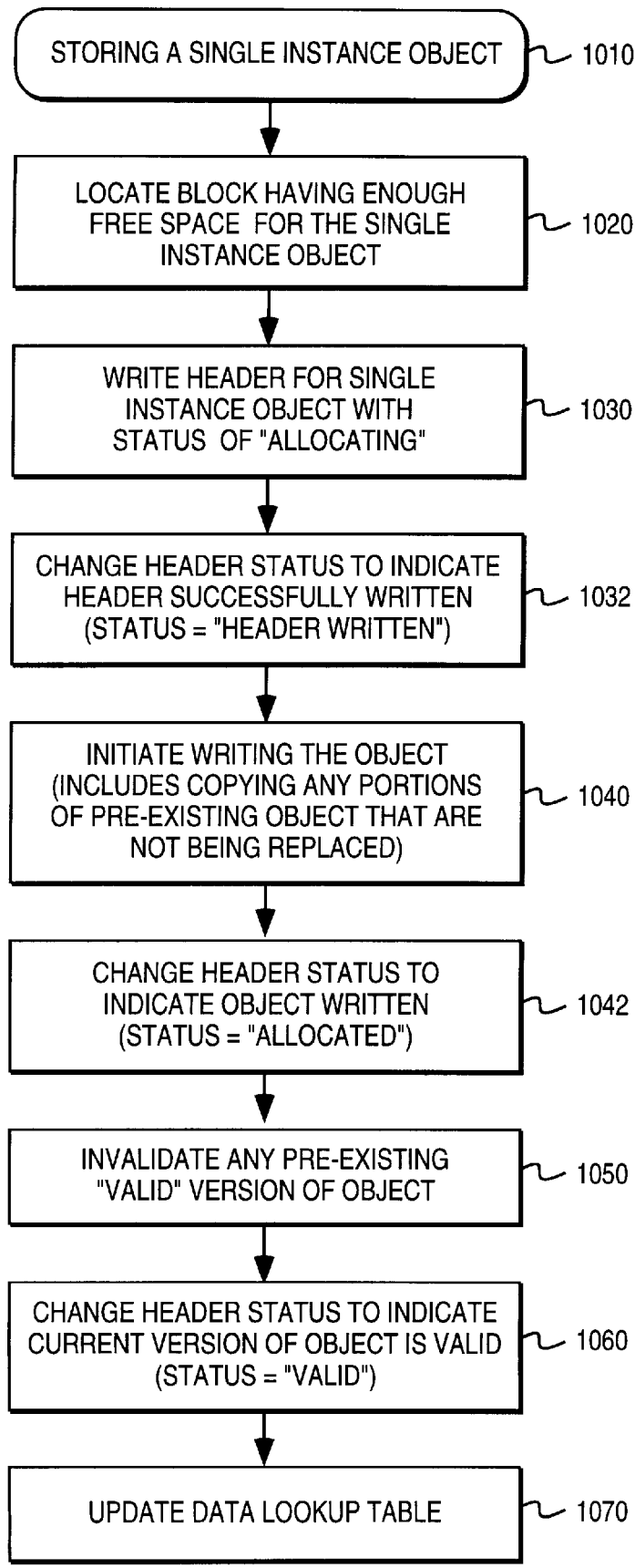

The process of writing a single instance object is illustrated in FIG. 10 beginning with step 1010. In step 1020, the block with the greatest amount of available free space is located. In step 1030, a header for the object is written with the status of "allocating." After the header has been successfully written the status is changed to "header written" in step 1032.

The process of writing the object is initiated in step 1040. If only a portion of the object is being written, the portion is treated as replacing the corresponding portion in a pre-existing version of the object. Any portions not being replaced must be the same as those in the pre-existing, valid version. Thus writing a new version of the object requires copying any portions of a pre-existing, valid version of the object that are not being replaced. The header status of the new version of the object is changed to "allocated" to indicate that the object has been written in step 1042.

Any pre-existing, "valid" version of the object is then invalidated in step 1050. In step 1060, the status for the object being written is changed to "valid." Finally, the data lookup table is updated in step 1070.

Figure 11:
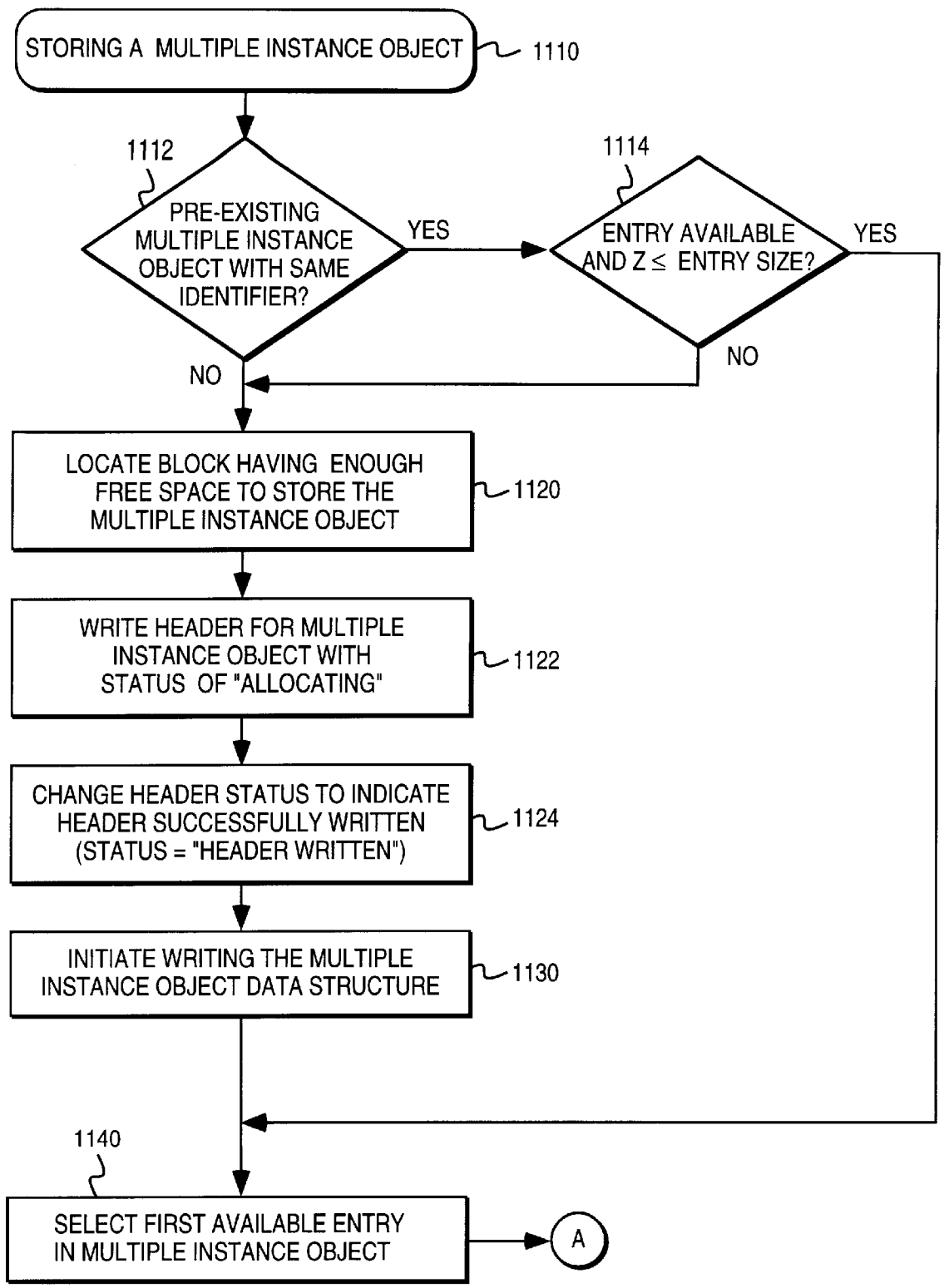
FIGS. 11–12 illustrate a method of writing a multiple instance object.
Figure 12:
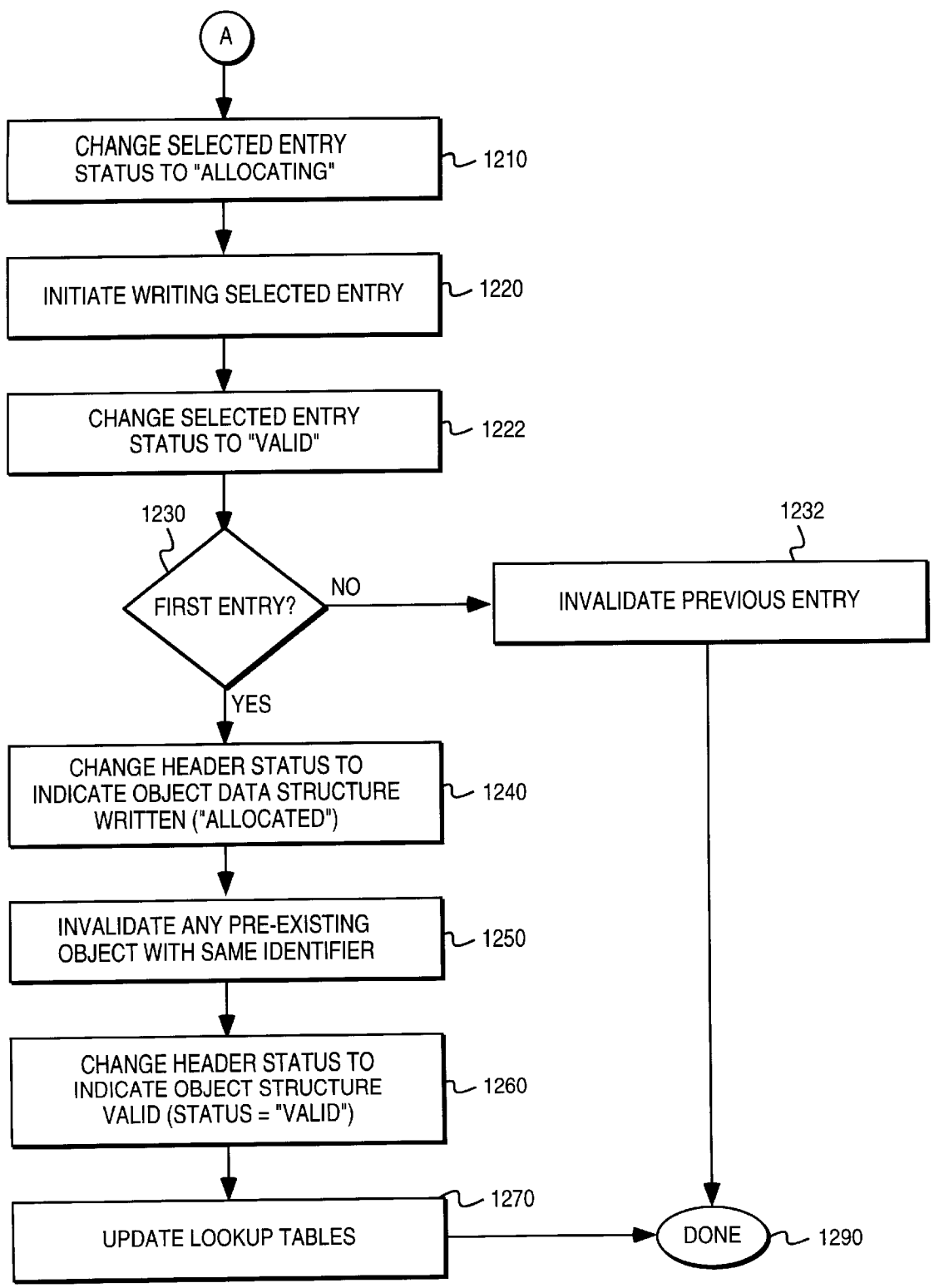

The process of writing a multiple instance object is similar as illustrated in FIGS. 11–12 beginning with step 1110. Step 1112 determines whether there is a pre-existing multiple-instance object with the same identifier. If so, then the process may be able to utilize an available entry within the pre-existing multiple-instance object.

If a pre-existing multiple instance object with the same name exists, processing continues with step 1112. Step 1114 determines whether 1) $z \leq$ the maximum amount of space available to each instance, and 2) if at least one entry is left for the object to be written. If both conditions are true, then this write operation can make use of an available multiple instance object entry. Otherwise, a new multiple instance object must be written in steps 1120–1132.

The process of a new multiple instance object begins in step 1120 by searching for a block with enough space to store the multiple instance object. In an alternative embodiment, the block with the greatest amount of free space is selected.

A multiple instance object header is written in step 1122 with a status of "allocating." The status is changed in step 1124 to indicate that the header was successfully written. Step 1130 initiates writing the multiple instance data structure.

In step 1140 the first available entry in the multiple instance structure is selected for storing the multiple instance object. Referring to FIG. 12, the status of the selected entry is changed to "allocating" in step 1210. Step 1220 initiates writing the object to the selected entry. The status of the selected entry is then changed to "valid" in step 1222.

An instance of the object has now been stored. Step 1230 determines if the available entry was the first entry in the current multiple instance object structure. If not, processing continues with step 1232 to invalidate the previous entry in the multiple instance object. The process of updating the multiple instance object is then completed in step 1290.

If the selected entry is the first entry in the multiple instance object, then additional steps are taken in 1240–1270 to invalidate pre-existing objects with the same identifier as well as validating the new multiple instance object. The multiple instance object status is changed to indicate a status of "allocated" in step 1240. Any pre-existing object with the same identifier is invalidated (status="invalid") in step 1250. The status of the new multiple instance object is then changed to "valid" in step 1260. The creation of a new multiple instance object requires updating the lookup tables in step 1270. The process of storing a multiple instance object is then completed in step 1290.

Figure 13:
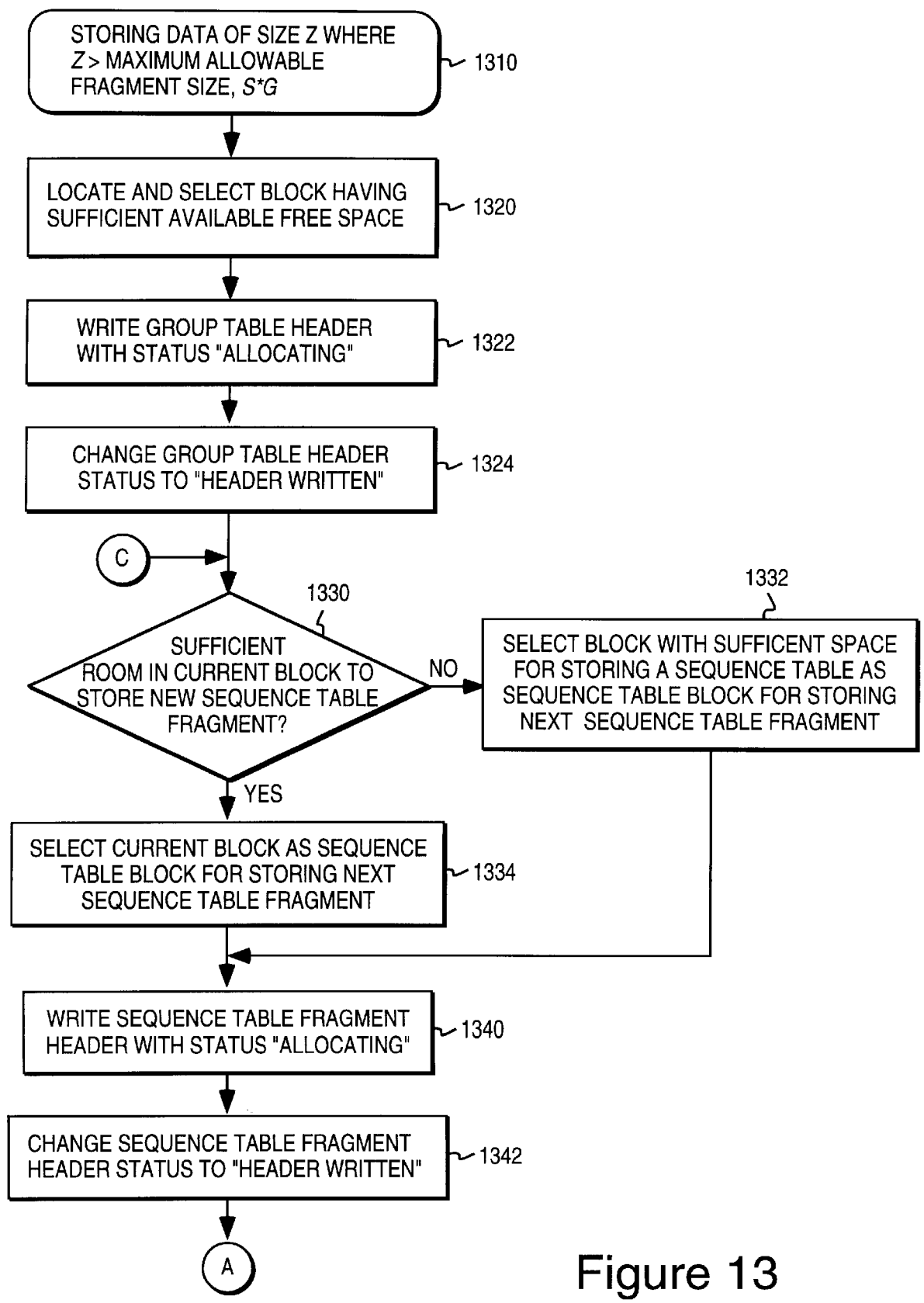
FIGS. 13–15 illustrate a method of storing an object as a plurality of data fragments.
Figure 14:
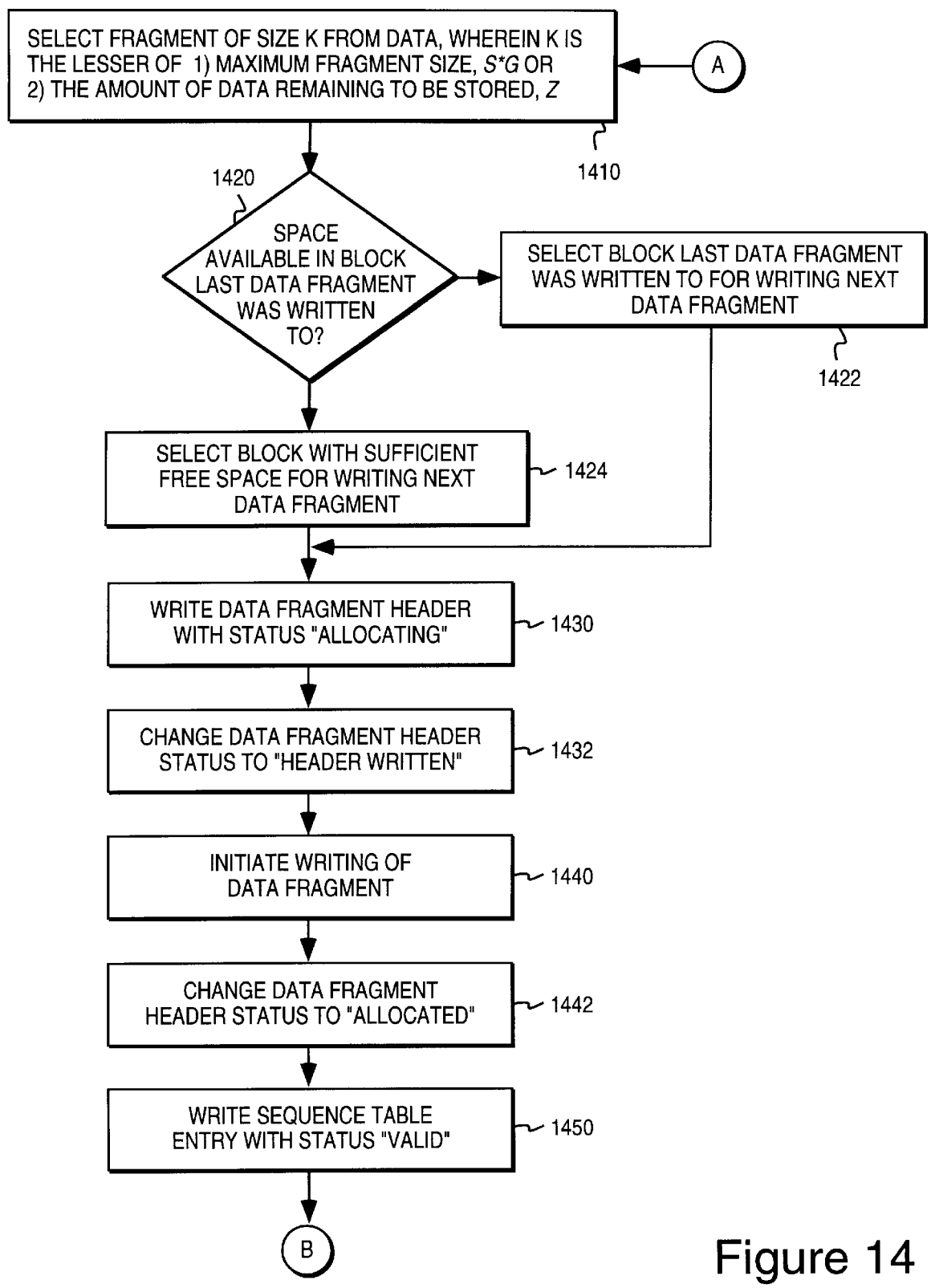
Figure 15:
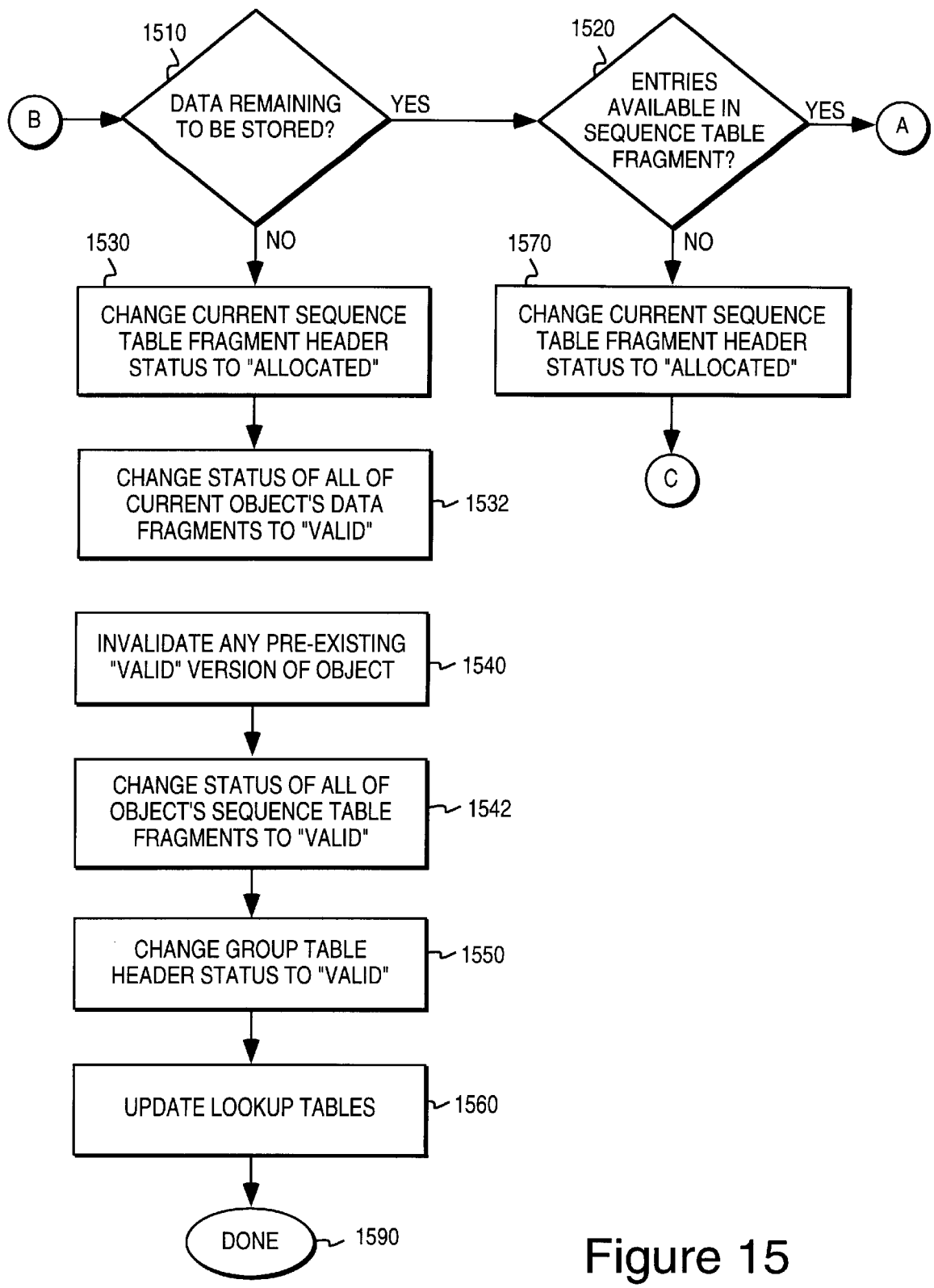

FIGS. 13–15 illustrate the process of writing an object as a plurality of data fragments when the size of the data to be written, z, exceeds the maximum size $s*g$ allocable to any fragment. In one embodiment, s is the maximum single instance object size expressed as a multiple of the granularity. The process begins with step 1310.

A block with sufficient free space is selected to write the group table to in step 1320. In one embodiment, no object is permitted to exceed the maximum size, $s*g$, thus any block capable of storing an object of size $s*g$ can be selected as the block for storing the group table. In one embodiment, the block with the greatest amount of available free space is selected.

In step 1322, a group table header is written with a status of "allocating." After writing the group table header, the status is changed to "header written" in step 1324.

Step 1330 determines whether there is sufficient space in the current block to create a sequence table fragment. The current block is the same block that the group table was created if this is the first sequence table fragment for the object. Otherwise, the current block is the block that the last data fragment was written to.

If there is insufficient space in the current block, the block with the most available space is selected as the sequence table block for writing the next sequence table fragment to in step 1332. Otherwise, the current block is selected as the sequence table block for writing the next sequence table fragment to in step 1334.

Once the sequence table block has been selected, a sequence table fragment header is written with a status of "allocating" in step 1340. After successfully writing the header, the status is changed to "header written" in step 1342.

FIG. 14 illustrates the process of writing each data fragment. In one embodiment, the data is stored by selecting fragments as large as possible until the object is completely stored. There are three possibilities: $z \leq g$, $g < z \leq s*g$, or $z > s*g$.

Step 1410 selects a fragment of size k from the remaining data, where k is the lesser of 1) the maximum fragment size, $s*g$, or 2) the amount of data remaining to be stored, z.

Step 1420 determines whether there is sufficient space in the block that the last data fragment was written to. If the amount of data remaining to be stored is less than the minimum fragment size (e.g., one granular unit, g), then the data fragment will still require one granular unit for storage even though $z \leq g$. If $g < z \leq s*g$, then there must be at least j granular units available for storage where j is an integer such that $z \leq j*g \leq s*g$. If $z > s*g$, then there must be sufficient space available to store a data fragment of size $s*g$.

If so then the block the last data fragment was written to is selected for writing the next data fragment in step 1422. (If this is the first data fragment for a given object, then the block that the sequence table fragment is located in is considered to be the block that the "last data fragment was written to.") Otherwise another block with sufficient space for writing the next data fragment is selected in step 1424.

A data fragment header is written in step 1430 with a status of "allocating." The status is changed to "header written" in step 1432. Step 1440 initiates writing the data fragment. After the data fragment has been written, the status of the data fragment is changed to "allocated" in step 1442. The sequence table entry for the data fragment is then written with a status of "valid." Processing then continues with FIG. 15.

Referring to FIG. 15, step 1510 determines whether any data remains to be stored. If so, processing continues with step 1520 to determine if another entry can be added to the current sequence table fragment. If the current sequence table fragment is not full, processing can continue with step 1410 of FIG. 14 to continue fragmenting and storing the data. If there is no more room in the current sequence table fragment, then the current sequence table fragment header status is set to "allocated" in step 1570. The process then continues fragmenting and storing the data fragments after returning to step 1330 of FIG. 13 to create a new sequence table fragment.

If no data remains to be stored in step 1510, the current sequence table fragment header status is changed to "allocated" in step 1530. At this point all the object's data fragments have been stored and can be located by the group table and sequence table fragments. Step 1532 changes the status of every data fragment associated with the object's group table to "valid."

Any pre-existing "valid" version of the object then invalidated in step 1540. All sequence table fragments associated with the current version of the object have their status changed to "valid" in step 1542. The status of the group table for the current version of the object is then changed to "valid" in step 1550. The lookup tables (e.g., data lookup table) are then updated in step 1560. The process of writing an object as a plurality of data fragments is then completed in step 1590.

The process of invalidating a valid previous version of an object as set forth in step 1050 of FIG. 10, step 1250 of FIG. 12, and step 1540 of FIG. 15 differs depending upon the object structure. To qualify as a valid previous version, the header of the object must have a status of "valid" and at least an identifier identical to that of the data being written. If the two versions of the object have different object structures, the preceding version must be invalidated in its entirety.

Invalidating a multiple instance object or a single instance object merely requires changing the status for these objects to "invalid." Invalidating a fragmented object, however, requires invalidating each data fragment, each sequence table fragment entry, each sequence table fragment, and finally the group table.

Creating and updating single instance objects and multiple instance objects generally requires replacing any previous version of the object. Thus for example, modifications to a single instance object will result in invalidating the previous version of the single instance object and writing a new object. Modifications to a multiple instance object will result in invalidating either a previous entry or even the previous multiple instance object structure in order to write a new version of the object. Thus modification of a single instance object or a selected instance of a multiple instance object typically results in the destruction of the previous version or instance of the object where appropriate.

Modifications to a fragmented object may only affect a particular data fragment or only a few data fragments. Changes, however, must be cascaded to the affected sequence table fragments and the group table. Due to the characteristics of flash memory, however, the sequence table fragments and the group table cannot be modified in place.

One way to achieve this goal is to rewrite the object every time. Such a technique, however, would be inefficient if only a small amount of the data needed to be updated. The characteristics of flash memory tend to encourage updating as little as possible in order to avoid time consuming erasures and copying. In one embodiment, only the affected sequence table fragments, group table, and data fragments are replaced.

Figure 16:
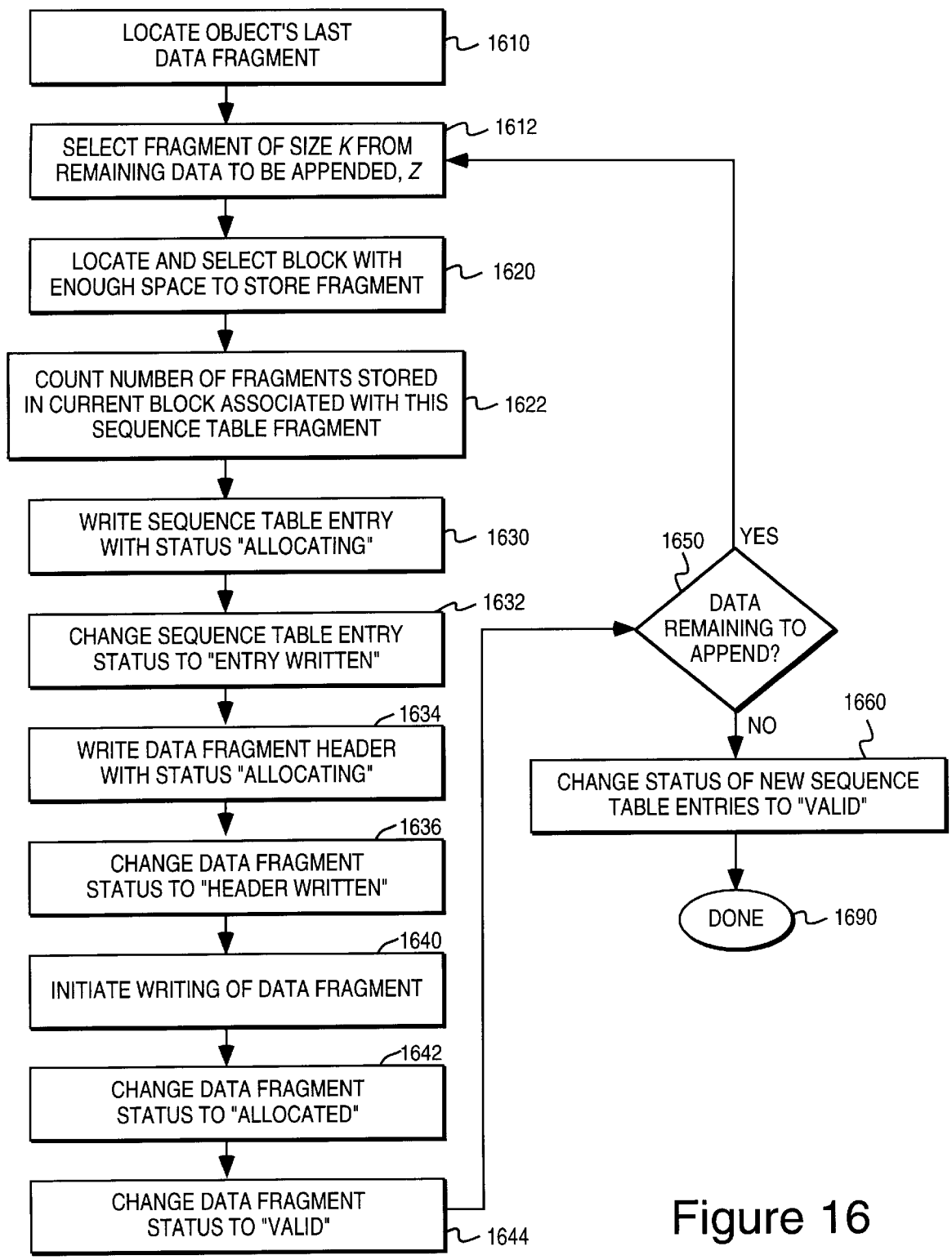
FIG. 16 illustrates a method for appending to a fragmented object when sufficient room is available in the last sequence table fragment.

Typical modifications to an object may include appending to the end of the object or replacing portions of the object. FIG. 16 illustrates the process of appending to the end of an object where the last sequence table fragment has sufficient entry space to accommodate more data fragments.

The object's last data fragment is located in step 1610. A fragment of size k is selected from the remaining data to be appended (z) in step 1612. In step 1620 a block with sufficient storage space to accommodate the fragment is located. Steps 1612 and 1620 are performed with the same constraints as steps 1410 and 1424 of FIG. 14.

In step 1622 the number of valid fragments in the selected block that are associated with the sequence table being appended to are counted. The sequence table entry is then written in step 1630 with a status of "allocating." The sequence table entry status is then changed to "entry written" in step 1632.

The data fragment header is written in step 1634 indicating that the data fragment status is "allocating." The status is changed to "header written" in step 1636. Step 1640 initiates writing the data fragment itself.

After the data fragment has been written, the data fragment status is changed to "allocated" in step 1642. The data fragment status is then changed "valid" in step 1644.

Step 1650 determines whether there is any data remaining to be appended. If so, steps 1612–1642 are repeated until there is no data remaining to be appended. After the data has been stored, the status of the new sequence table entries is changed to "valid" in step 1670. The process of appending when sufficient space exists in the present sequence table is finished in step 1690.

Figure 17:
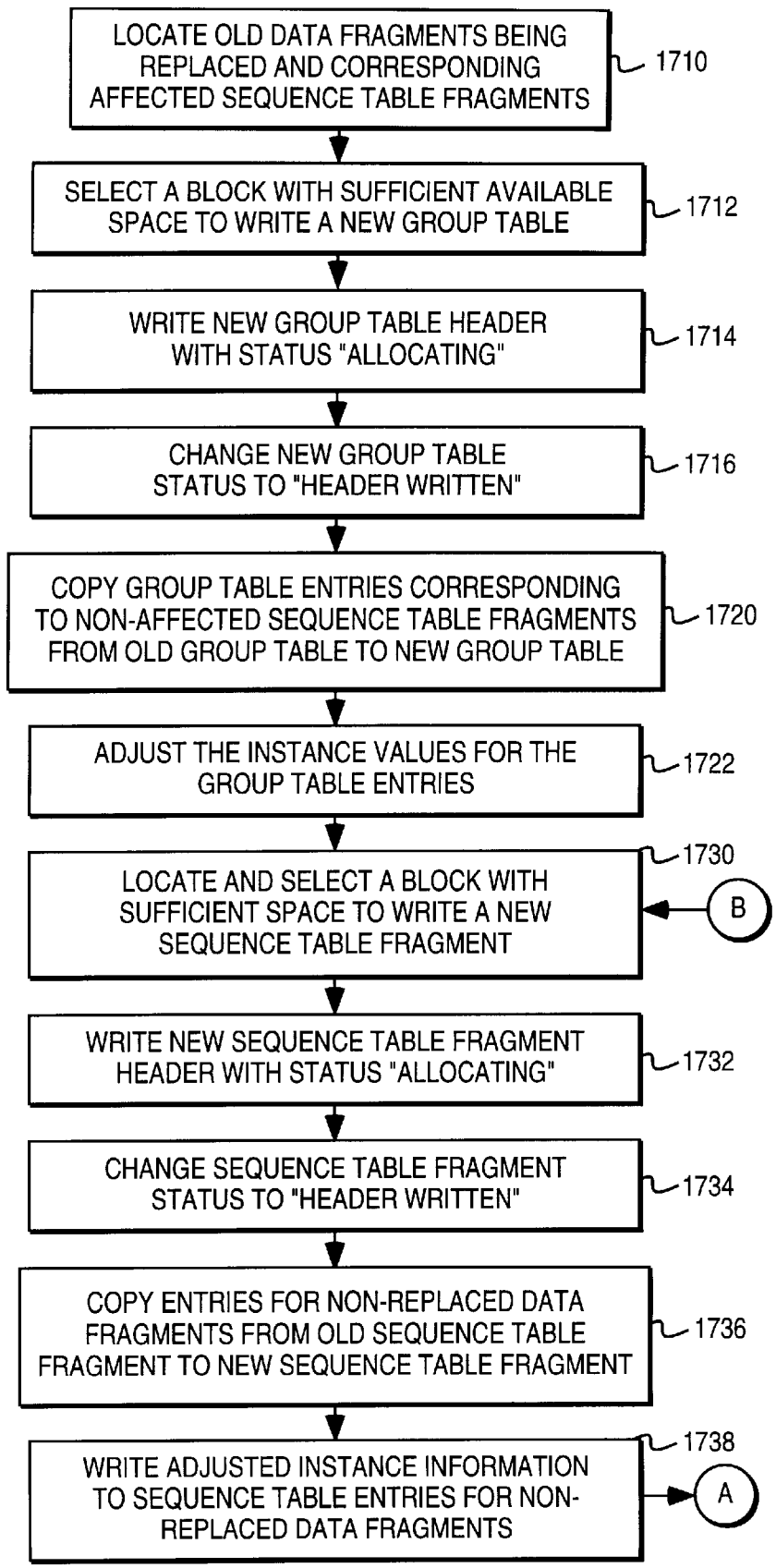
FIGS. 17–19 illustrates a method for replacing selected fragments of a fragmented object.
Figure 18:
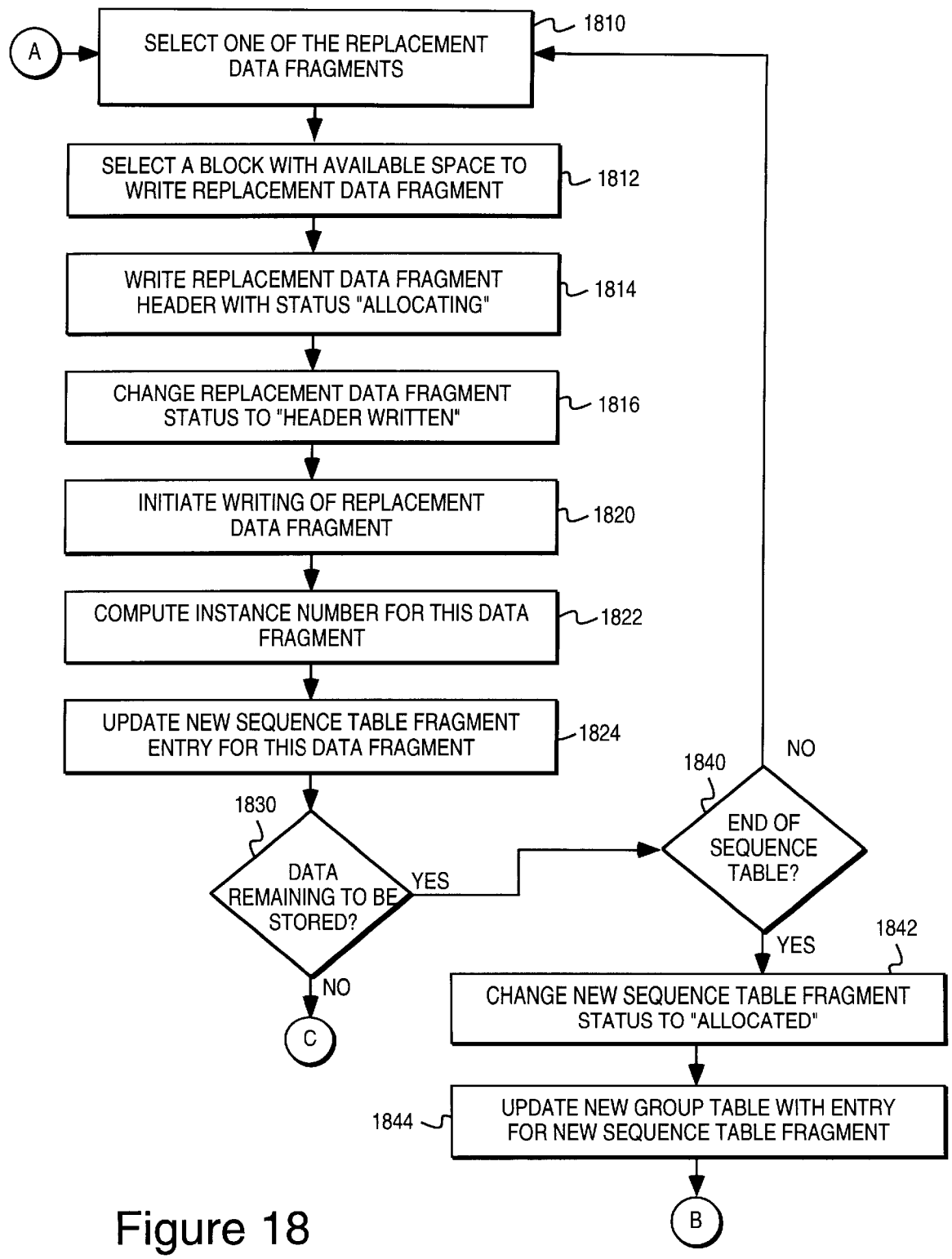

FIGS. 17–18 illustrate the process of replacing portions of a fragmented object on a one-to-one fragment basis (i.e., a fragment is replaced by only one other fragment). Generally, any replaced data fragments will be invalidated. Their associated sequence table fragments must be rewritten with the locations of the replacement data fragments. Similarly, the group table must be rewritten to reflect the new location of the sequence table fragments.

The data fragments to be replaced and their corresponding sequence table fragments are located in step 1710. A block with sufficient space to store a new group table is located in step 1712. The new group table header is written in step 1714 with a status of "allocating." The status of the new group table is changed to "header written" in step 1716.

Step 1720 copies the unaffected group table entries from the old group table to the new group table without the instance information for the sequence table fragments. The unaffected group table entries identify the location of the sequence table fragments that are not changing. When more than one sequence table fragment for the same object is located in the same block, the elimination of one of the sequence table fragments during the replacement process necessarily changes the instance information (i.e., "count") for all the object's subsequent sequence table fragments located in the same block. Thus step 1722 updates the instance information for the otherwise unchanged group table entries identifying unchanged sequence table fragments.

Steps 1730 through 1844 are applied to each sequence table being replaced. Step 1730 locates a block with sufficient space for writing a new sequence table fragment for a selected old sequence table fragment. A new sequence table fragment header is written with a status of "allocating" in step 1732. The new sequence table fragment status is changed to "header written" in step 1734. The entries of the old sequence table that identify unchanged data fragments are copied (without the instance information) to the new sequence table in step 1736. These entries then have their instance information updated in step 1738. The updating of the instance information for individual sequence table entries does not count the data fragments being replaced when computing the instance information for the unchanged data fragments.

The process continues in FIG. 18 by selecting one of the replacement data fragments in step 1810. A block with sufficient space to write one of the replacement data fragments is selected in step 1812. The data fragment header is written with a status of "allocating" in step 1814. The Table Number (312) that associates the data fragment with the new sequence table fragment is also written as part of the header in step 1814. The data fragment status is changed to "header written" in step 1816.

Step 1820 initiates writing the replacement data fragment. The instance number for this fragment is then calculated in step 1822 before writing the instance information to the sequence table entry identifying this data fragment in step 1824.

Step 1830 determines whether there are additional data fragments to be stored. If so and the selected sequence table fragment is not full (1840), the processing returns to step 1810 to continue replacing the data fragments associated with the selected sequence table fragment. If the sequence table fragment is full (1840), then the new sequence table fragment status is changed to "allocated" (1842) and the new group table is updated with the information for this sequence table fragment in step 1844 before returning to step 1740 to create a new sequence table fragment.

Figure 19:
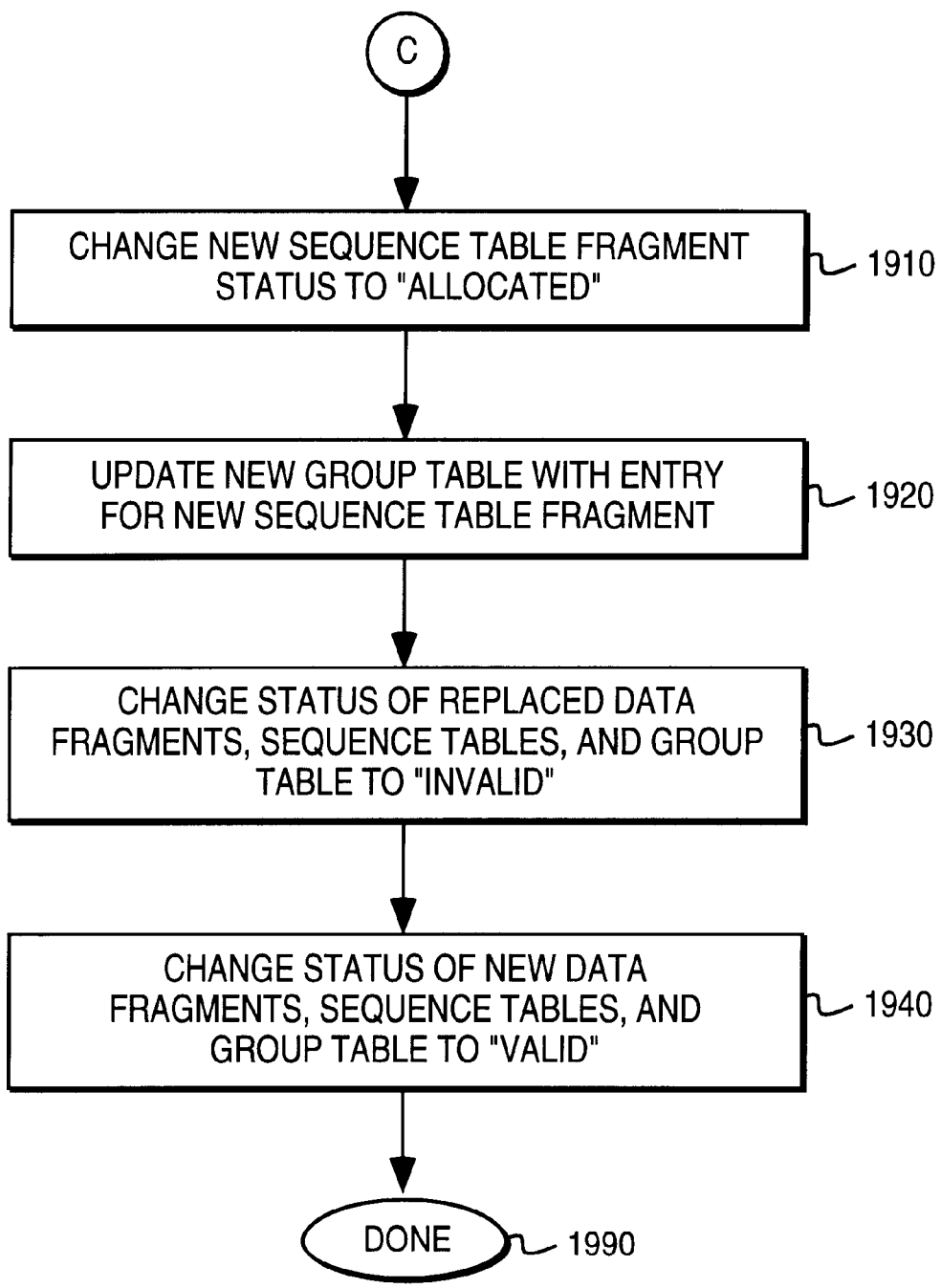

If there are no more data fragments to be stored, then the new sequence table fragment status is changed to "allocated" in step 1910 of FIG. 19 and the new group table is updated with the information for this sequence table fragment in step 1920. The status of all replaced data fragments, sequence table fragments, and the old group table is then changed to "invalid" in step 1930. The status of the new data fragments, sequence table fragments, and group table is then changed to "valid" in step 1940 before completing the process in step 1990.

The embodiments of writing and modifying the data described above use a number of status values in order to enable recovering to a previous state in the event of a power loss during a write or modification operation. The status of each entry of a sequence table, the sequence table itself, every data fragment identified in the sequence table, and the group table are changed at specific points during the writing and modifying processes. The multiple status values enable determining if one of the processes was interrupted and at what point. If the writing or modifying process is not completed, the nonvolatile memory can be restored to a known state. If power loss recovery is unnecessary the intermediate steps need not be tracked.

Eventually the nonvolatile memory will reach a pre-determined threshold corresponding to an amount of invalid data. In one embodiment, the threshold is based on the amount of invalid data in a given block. Alternatively, the threshold may be based on the total amount of invalid data in the nonvolatile memory.

Figure 20:
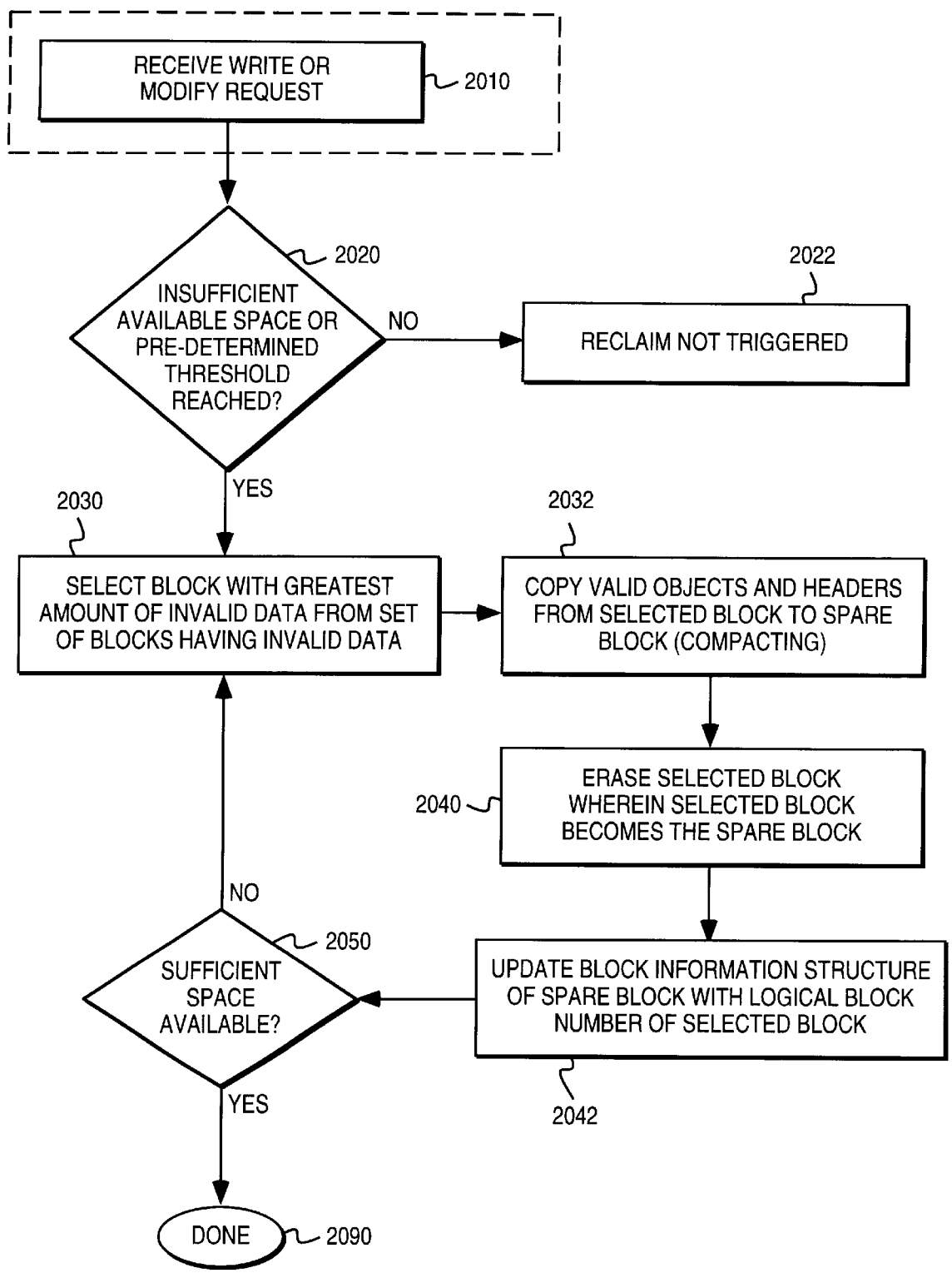
FIG. 20 illustrates a method for reclaiming space within the nonvolatile memory.

The space used by the invalid data can be recovered and made available for storage through a process referred to as "reclamation." FIG. 20 illustrates a reclamation process. In one embodiment, once the amount of available space falls below a pre-determined threshold a reclamation operation is triggered (step 2020). Otherwise reclamation is not triggered as indicated in step 2022.

In one embodiment, the reclamation process prioritizes the blocks for recovery by selecting the block(s) with the most amount of invalid data from the set of blocks that contain invalid data (step 2030). All valid objects within the selected block are copied from the selected block to the spare block 116 in step 2032.

When copying the valid objects, the space previously used by the invalid objects is compacted out so that the headers of the valid objects are contiguous and the objects themselves are similarly located contiguous to each other as illustrated in FIG. 2. Thus the amount of space previously used by invalid objects (and their corresponding headers) is recovered resulting in an increase in the size of area 230.

The block information structure 240 for the spare block 116 is updated with the logical block number of the selected block in step 2040. The selected block is then erased and becomes the new spare block to be used when reclaiming another block in step 2042.

In one embodiment, the reclaim process is triggered only in response to a write or a modify command as indicated by step 2010. Once triggered in step 2020, the reclamation process repeats steps 2030–2050 until there is sufficient free space to perform the requested operation as determined in step 2050.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method for a memory, the method comprising:

selecting a data structure among multiple types of data structures to store data, the data structure being selected based on one or more parameters associated with the data, wherein selecting the data structure includes selecting a single instance data structure to store a single instance data object, if a size parameter of the single instance data object is not larger than a maximum size parameter related to the single instance data object; and storing the data in the selected data structure such that the selected data structure satisfies the one or more parameters.

2. The method of claim 1, wherein selecting a single instance data structure includes:

fragmenting the single instance data object if the size parameter of the single data object is larger than the maximum size parameter related to the single instance data object; and selecting multiple single instance data structures to store the fragmented single instance data object.

3. The method of claim 2, wherein the maximum size parameter for the single instance data object is a size of a block of the memory.

4. The method of claim 1, wherein selecting a data structure includes:

selecting a multiple instance data structure to store the data including a multiple instance data object, the multiple instance data object including a plurality of data units.

5. The method of claim 4, wherein selecting a multiple instance data structure includes:

selecting the multiple instance data structure, if a size parameter related to the plurality of data units is not larger than an amount of available memory.

6. The method of claim 1, wherein storing the data includes:

storing the data in a nonvolatile memory.

7. The method of claim 6, wherein storing the data in a nonvolatile memory includes:

storing the data in a nonvolatile flash memory.

8. A memory management system comprising:

a memory to contain one or more data structures among multiple types of data structures, the data structures to store data; and a memory manager to select a data structure based on one or more parameters associated with the data, to select a single instance data structure to store a single instance data object, if a size parameter of the single instance data object is not larger than a maximum size parameter related to the single instance data object, and to store the data in the selected data structure within the memory such that the selected data structure satisfies the one or more parameters.

9. The memory management system of claim 8, wherein the memory manager is to fragment the single instance data object, if the size parameter of the single data object is larger than the maximum size parameter related to the single instance data object, and is to select multiple single instance data structures to store the fragmented single instance data object.

10. The memory management system of claim 9, wherein the maximum size parameter for the single instance data object is a size of a block of the memory.

11. The memory management system of claim 8, wherein the memory manager is to select a multiple instance data structure to store the data and a multiple instance data object, the multiple instance data object including a plurality of data units.

12. The memory management system of claim 11, wherein the memory manager is to select the multiple instance data structure, if a size parameter related to the plurality of data units is not larger than an amount of available memory.

13. The memory management system of claim 8, wherein the memory is a nonvolatile memory and the memory manager is to store the date in the nonvolatile memory.

14. The memory management system of claim 13, wherein the nonvolatile memory is a nonvolatile flash memory and the memory manager is to store the data in the nonvolatile flash memory.

* * * * *